United States Patent [19]

Yamamoto et al.

[11] Patent Number: 5,412,020
[45] Date of Patent: May 2, 1995

[54] PROPYLENE POLYMER COMPOSITIONS

[75] Inventors: Akihiko Yamamoto; Yurimasa Zenitani; Masayoshi Yamaguchi, all of Kuga, Japan

[73] Assignee: Mitsui Petrochemical Industries, Ltd., Tokyo, Japan

[21] Appl. No.: 281,610

[22] Filed: Jul. 28, 1994

[30] Foreign Application Priority Data

| Jul. 28, 1993 | [JP] | Japan | 5-186409 |
| Jul. 28, 1993 | [JP] | Japan | 5-186410 |
| Jul. 28, 1993 | [JP] | Japan | 5-186411 |

[51] Int. Cl.⁶ .............................................. C08L 53/00
[52] U.S. Cl. ................................... 524/505; 524/515; 524/525; 525/88; 525/89
[58] Field of Search ............... 525/88, 89; 524/505, 524/515, 525

[56] References Cited

U.S. PATENT DOCUMENTS

| 4,128,606 | 12/1978 | Furutachi et al. | 525/247 |
| 4,522,994 | 6/1985 | Chiba et al. | 526/351 |
| 4,871,805 | 10/1989 | Shimomura et al. | 525/98 |
| 5,266,636 | 11/1993 | Kioka et al. | 525/95 |
| 5,332,789 | 7/1994 | Tanaka et al. | 525/323 |

FOREIGN PATENT DOCUMENTS

| 321218 | 6/1898 | European Pat. Off. |
| 273228 | 7/1988 | European Pat. Off. |
| 463963 | 1/1992 | European Pat. Off. |
| 530486 | 3/1993 | European Pat. Off. |
| 60-58459 | 4/1985 | Japan |
| 60-60154 | 4/1985 | Japan |
| 61-36348 | 2/1986 | Japan |
| 61-233048 | 10/1986 | Japan |
| 62-122751 | 6/1987 | Japan |
| 62-235350 | 10/1987 | Japan |
| 63-150343 | 6/1988 | Japan |
| 1204947 | 8/1989 | Japan |
| 1271450 | 10/1989 | Japan |
| 51-70843 | 7/1993 | Japan |
| 1566391 | 4/1980 | United Kingdom |
| 1581167 | 12/1980 | United Kingdom |
| 2213156 | 8/1989 | United Kingdom |

OTHER PUBLICATIONS

Ray, et al., (1977), Macromolecules, 10, 773–778.
Hsieh, et al., (1982), Macromolecules, 15, 353–360.
Randal, (1973), J. Polymer Sci., 11, 275–287.
Kimura, et al., (1984), Polymer, 25, 441–446.
Database WPI, Derwent Publications Ltd. AN-8-5-027389, Dec. 1984.

Primary Examiner—Ana L. Carrillo
Attorney, Agent, or Firm—Sherman and Shalloway

[57] ABSTRACT

The propylene polymer composition of the invention comprises, as its essential components, a specific propylene polymer [A] described below and a propylene block copolymer [B]. In addition to the propylene polymer [A] and the propylene block copolymer [A], the propylene polymer composition may contain a thermoplastic elastomer [C] selected from polystyrene.polyethylene/poybutylene.polystyrene block copolymers and ethylene/α-olefin random copolymers, or may further contain an inorganic filler [D]. The propylene polymer [A] used in the invention has the following characteristic properties:

(1) a boiling heptane-insoluble component is contained in said polymer in an amount of not less than 96% by weight, (2) a pentad isotacticity $[M_5]$ of the boiling heptane-insoluble component obtained from the following formula (1) using a $^{13}$C-NMR spectrum is in the range of 0.970 to 0.995:

$$[M_5] = \frac{[Pmmmm]}{[Pw]} \quad (1)$$

(3) a pentad tacticity $[M_3]$ of the boiling heptane-insoluble component obtained from the following formula (2) using a $^{13}$C-NMR spectrum is in the range of 0.0020 to 0.0050:

$$[M_3] = \frac{[Pmmrm] + [Pmrmr] + [Pmrrr] + [Prmrr] + [Prmmr] + [Prrrr]}{[Pw]} \quad (2)$$

and (4) a melt flow rate (MFR) of said polymer is in the range of 5 to 50 g/10 min. The propylene polymer compositions of the invention are excellent in both of rigidity and impact strength.

5 Claims, 1 Drawing Sheet

Fig. 1

[I] Transition metal catalyst component
- Titanium compound
- Magnesium compound
- Electron donor

[II] Organometallic catalyst component
- Organoaluminum compound

[III] Silicon compound $$R^1\!\!-\!\!\underset{R^2}{\overset{OCH_3}{\underset{|}{\overset{|}{Si}}}}\!\!-\!\!OCH_3$$

($R^1$ and $R^2$ are each a cyclopentyl group, a tertiary hydrocarbon group, etc.)

→ Prepolymerization → Olefin polymerization catalyst

PROPYLENE POLYMER COMPOSITIONS

FIELD OF THE INVENTION

The present invention relates to propylene polymer compositions, and more particularly to propylene polymer compositions capable of producing molded products excellent in rigidity and impact strength as well as in heat resistance.

BACKGROUND OF THE INVENTION

Crystalline polypropylene is excellent in rigidity, heat resistance and surface glossiness, but is poor in impact resistance.

Therefore, various polypropylene compositions improved in the impact resistance have been heretofore proposed. For example, polypropylene compositions containing crystalline polypropylene and modifiers such as polyethylene and rubber-like materials are known. Examples of the rubber-like materials conventionally used include a non-crystalline or low-crystalline ethylene/propylene random copolymer (EPR), polyisobutylene and polybutadiene.

In order to improve the impact resistance by adding such a rubber-like material as mentioned above, a large amount of the rubber-like material must be added to polypropylene. However, polypropylene compositions containing a large amount of the rubber-like material are lowered in the rigidity, the heat resistance and the surface hardness, though they are improved in the impact resistance.

On that account, polypropylene compositions further containing inorganic fillers in combination with the rubber-like materials have been proposed to improve rigidity, as described in Japanese Patent Laid-Open Publications No. 58459/1985, No. 60154/1985, No. 233048/1986, No. 36348/1986, No. 235350/1987, No. 122751/1988, No. 150343/1988, No. 149845/1989, No. 204947/1989, No. 271450/1989, etc.

However, the polypropylene compositions containing a large amount of the rubber-like material have a limit in the improvement in rigidity by the addition of the inorganic filler, and therefore they cannot be applied to such uses as require high rigidity.

As a replacement of such conventional polypropylene compositions, Japanese Patent Laid-Open Publication No. 156842/1988 proposes a polypropylene composition comprising polypropylene of high stereoregularity and a polystyrene.polyethylene/polybutylene.polystyrene block copolymer (SEBS), which shows good rigidity and impact resistance. However, it has been desired to develop polypropylene compositions much more improved in rigidity and impact resistance according to uses.

OBJECT OF THE INVENTION

The present invention has been made in the light of the foregoing prior art technique, and it is an object of the invention to provide propylene polymer compositions which are excellent in both of rigidity and impact strength.

SUMMARY OF THE INVENTION

The propylene polymer compositions according to the invention comprises, as their essential components, a specific propylene polymer [A] and a specific propylene block copolymer [B], both described below.

The first propylene polymer composition of the invention comprises:

[A] a propylene polymer in an amount of 10 to 90% by weight, and

[B] a propylene block copolymer in an amount of 90 to 10% by weight.

The second propylene polymer composition of the invention comprises:

[A] a propylene polymer in an amount of 10 to 80% by weight,

[B] a propylene block copolymer in an amount of 5 to 70% by weight, and

[C] a thermoplastic elastomer in an amount of 10 to 30% by weight, selected from polystyrene.polyethylene/polybutylene.polystyrene block copolymers and ethylene/α-olefin random copolymers.

The third propylene polymer composition of the invention comprises:

[A] a propylene polymer in an amount of 10 to 70% by weight,

[B] a propylene block copolymer in an amount of 5 to 60% by weight,

[C] a thermoplastic elastomer in an amount of 15 to 25% by weight, selected from polystyrene.polyethylene/polybutylene.polystyrene block copolymers and ethylene/α-olefin random copolymers, and

[D] an inorganic filler in an amount of 5 to 15% by weight.

The propylene polymer [A] included in the propylene polymer compositions of the invention has the following characteristic properties:

(1) a boiling heptane-insoluble component is contained in the polymer in an amount of not less than 96% by weight;

(2) a pentad isotacticity $[M_5]$ of the boiling heptane-insoluble component obtained from the following formula (1) using a $^{13}$C-NMR spectrum is in the range of 0.970 to 0.995:

$$[M_5] = \frac{[Pmmmm]}{[Pw]} \quad (1)$$

wherein

[Pmmmm] is absorption intensity of methyl groups on third propylene units in five propylene unit sequences where the five units are bonded isotactically to each other, and

[Pw] is absorption intensity of all methyl groups in propylene units;

(3) a pentad tacticity $[M_3]$ of the boiling heptane-insoluble component obtained from the following formula (2) using a 13C-NMR spectrum is in the range of 0.0020 to 0.0050:

$$[M_3] = \frac{[Pmmrm] + [Pmrmr] + [Pmrrr] + [Pmrrr] + [Prmmr] + [Prrrr]}{[Pw]} \quad (2)$$

wherein

[Pmmrm] is absorption intensity of methyl groups on third propylene units in five propylene unit sequences represented by ⌐ ⌐ ⌐ ⌐ ⌐ in which ⌐ and  are each a propylene unit,

[Pmrmr] is absorption intensity of methyl groups on third propylene units in five propylene unit sequences represented by ⌐ ⌐ ⌐ ⌐ ⌐ in which ⌐ and ⌐ are each a propylene unit,

[Pmrrr] is absorption intensity of methyl groups on third propylene units in five propylene unit sequences represented by ⌋ ⌋ ⌐ ⌋ ⌐ in which ⌋ and ⌐ are each a propylene unit,

[Prmrr] is absorption intensity of methyl groups on third propylene units in five propylene unit sequences represented by ⌐ ⌋ ⌋ ⌐ ⌋ in which ⌋ and ⌐ are each a propylene unit,

[Prmmr] is absorption intensity of methyl groups on third propylene units in five propylene unit sequences represented by ⌐ ⌋ ⌋ ⌋ ⌐ in which ⌋ and ⌐ are each a propylene unit,

[Prrrr] is absorption intensity of methyl groups on third propylene units in five propylene unit sequences represented by⌋ ⌐ ⌋ ⌐ ⌋ in which ⌋ and ⌐ are each a propylene unit, and

[Pw] is absorption intensity of all methyl groups in propylene units; and (4) a melt flow rate (MFR) of the polymer, as measured in accordance with ASTM D-1238 at 230° C. under a load of 2.16 kg, is in the range of 5 to 50 g/10 min.

It is preferred that the propylene polymer [A] contains units derived from a compound represented by the following formula (i) or (ii) in an amount of 0.005 to 0.05 by mol:

$$H_2C\!=\!CH\!-\!X \quad \text{(i)}$$

$$H_2C\!=\!CH\!-\!CH_2X \quad \text{(ii)}$$

wherein X is a cycloalkyl group, an aryl group or $$\begin{array}{c} R^1 \\ | \\ -M-R^2, \\ | \\ R^3 \end{array}$$

M is carbon or silicon, $R^1$ and $R^2$ are each a hydrocarbon group, and $R^3$ is hydrogen or a hydrocarbon group.

The compound represented by the above formula (i) or (ii) is preferably 3-methyl-1-butene.

The propylene block copolymer [B] included in the propylene polymer compositions of the invention has the following characteristic properties:

(1) a melt flow rate (MFR) of the copolymer, as measured in accordance with ASTM D-1238 at 230° C. under a load of 2.16 kg, is in the range of 10 to 50 g/10 min;

(2) a 23° C. n-decane-soluble component is contained in the copolymer in an amount of 5 to 13% by weight; and (3) constituent units derived from ethylene are contained in the 23° C. n-decane-soluble component in an amount of 30 to 50% by mol.

According to the present invention, propylene polymer compositions excellent in rigidity and impact resistance are provided.

BRIEF DESCRIPTION OF THE DRAWING

FIG. 1 illustrates steps of a process for preparing an olefin polymerization catalyst which is used for preparing the propylene polymer [A] and the propylene block copolymer [B] for use in the invention.

DETAILED DESCRIPTION OF THE INVENTION

The propylene polymer compositions according to the invention will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

The propylene polymer compositions of the invention comprise each a specific propylene polymer [A] and a specific propylene block copolymer [B].

The components for the propylene polymer compositions of the invention are described below in detail.

Propylene Polymer [A]

The propylene polymer [A] is substantially a crystalline homopolypropylene, as specifically described below.

(1) Boiling Heptane-insoluble Component

The propylene polymer [A] contains a boiling heptane-insoluble component in an amount of not less than 96% by weight, preferably not less than 98% by weight.

The boiling heptane-insoluble component of the propylene polymer can be obtained by the following manner.

A 1-liter flask equipped with a stirrer is charged with 3 g of a polymer sample, 20 mg of 2,6-di-tert-butyl-4-methylphenol and 500 ml of n-decane, and heated at 145° C. in an oil bath to dissolve the polymer sample. After the polymer sample is dissolved, the resulting solution is cooled to room temperature over a period of about 8 hours, followed by keeping it for 8 hours in a water bath of 23° C. so as to precipitate a polymer. The resulting n-decane suspension containing the precipitated polymer (23° C. n-decane-insoluble component) is separated by filtration through a glass filter of G-4 (or G-2) and dried under reduced pressure. Then, 1.5 g of the polymer thus dried is extracted with heptane using a Soxhlet extractor over a period of not shorter than 6 hours. Thus, a boiling heptane-insoluble component is obtained as the extraction residue.

In the propylene polymer [A] for use in the invention, a pentad isotacticity [$M_5$] and a pentad tacticity [$M_3$] of the boiling heptane-insoluble component, as determined by the peak intensity of a $^{13}$C-NMR spectrum, are the following values.

In the present invention, the $^{13}$C-NMR measurement of the boiling heptane-insoluble component is carried out, for example, in the following manner. That is, 0.35 g of the insoluble component is dissolved in 2.0 ml of hexachlorobutadiene, and the resulting solution is filtered through a glass filter (G2). To the filtrate is added 0.5 ml of deuterated benzene, and the resulting mixture is introduced into a NMR tube having an inner diameter of 10 mm, followed by measuring the $^{13}$C-NMR spectrum at 120° C. by the use of an NMR measuring apparatus (GX-500 type) produced by Japan Electron Optics Laboratory Co., Ltd. The number of integration times is 10,000 or more. The values of the pentad isotacticity [$M_5$] and the pentad tacticity [$M_3$] can be determined from the peak intensity based on each structures obtained by the above measurement and the total of the peak intensities, respectively.

(2) Pentad Isotacticity [$M_5$]

The pentad isotacticity [$M_5$] of the boiling heptane-insoluble component in the propylene polymer [A], as calculated by the following formula (1), is in the range of 0.970 to 0.995, preferably 0.980 to 0.995, more preferably 0.982 to 0.995.

$$[M_5] = \frac{[Pmmmm]}{[Pw]} \quad (1)$$

wherein

[Pmmmm] is absorption intensity of methyl groups on third propylene units in five propylene unit sequences where the five units are bonded isotactically to each other, and

[Pw] is absorption intensity of all methyl groups in propylene units.

The structure of the propylene polymer (boiling heptane-insoluble component) is represented by, for example, the following formula (A):

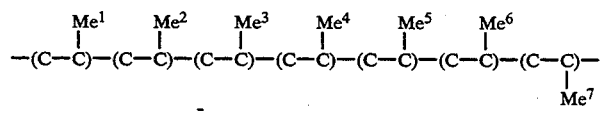

(A)

If a propylene unit

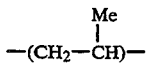

is symbolized by ⌐ or ⌐, ⌐ ⌐ is expressed by "m" (meso form), and ⌐ ⌐ is expressed by "r" (racemo form), five propylene isotactic unit sequences are expressed by ⌐ m ⌐ m ⌐ m ⌐ m ⌐. When absorption intensity, in a $^{13}$C-NMR spectrum, of methyl groups (e.g., Me$^3$, Me$^4$) on the third unit in the five propylene unit sequences is expressed by [Pmmmm], and absorption intensity of all methyl groups (e.g., Me$^1$, Me$^2$, Me$^3$ ...) in the propylene units is expressed by [Pw], the stereoregularity of the propylene polymer represented by the above formula (A) can be evaluated by a value of [M$_5$] obtained from the above formula (1).

(2) Pentad Tacticity [M$_3$]

The pentad tacticity [M$_3$] of the boiling heptane-insoluble component in the propylene polymer [A], as calculated by the following formula (2), is in the range of 0.0020 to 0.0050, preferably 0.0023 to 0.0045, more preferably 0.0025 to 0.0040.

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups on third propylene units in five propylene unit sequences represented by ⌐ ⌐ ⌐ ⌐ ⌐ in which ⌐ and ⌐ are each a propylene unit,

[Pmrmr] is absorption intensity of methyl groups on third propylene units in five propylene unit sequences represented by ⌐ ⌐ ⌐ ⌐ ⌐ in which ⌐ and ⌐ are each a propylene unit,

[Pmrrr] is absorption intensity of methyl groups on third propylene units in five propylene unit sequences represented by ⌐ ⌐ ⌐ ⌐ ⌐ in which ⌐ and ⌐ are each a propylene unit,

[Prmrr] is absorption intensity of methyl groups on third propylene units in five propylene unit sequences represented by ⌐ ⌐ ⌐ ⌐ ⌐ in which ⌐ and ⌐ are each a propylene unit,

[Prmmr] is absorption intensity of methyl groups on third propylene units in five propylene unit sequences represented by ⌐ ⌐ ⌐ ⌐ ⌐ in which ⌐ and ⌐ are each a propylene unit,

[Prrrr] is absorption intensity of methyl groups on third propylene units in five propylene unit sequences represented by ⌐ ⌐ ⌐ ⌐ ⌐ in which ⌐ and ⌐ are each a propylene unit, and

[Pw] is absorption intensity of all methyl groups in propylene units.

In the above formula (2), each of [Pmmrm], [Pmrmr], [Pmrrr], [Prmrr], [Prmmr] and [Prrrr] shows absorption intensity of the methyl group on the third propylene unit in each of the five propylene unit sequences which have such a structure that three out of five methyl groups in the five propylene unit sequences are the same in the direction and the remaining two are different in the direction (such structures are referred to as "M$_3$ structure" hereinafter). That is, the value of the pentad tacticity [M$_3$] obtained from the above formula (2) exhibits a proportion of the M$_3$ structures in the propylene unit sequences.

In the propylene polymer [A] for use in the invention, the value of the pentad isotacticity [M$_5$] of the boiling heptane-insoluble component obtained from the formula (1) is in the range of 0.970 to 0.995, and the value of the pentad tacticity [M$_3$] of the boiling heptane-insoluble component obtained from the formula (2) is in the range of 0.0020 to 0.0050. Such propylene polymer [A] has an extremely long mesochain (i.e., propylene unit sequence in which directions of α-methyl carbons are the same as each other).

In general, propylene polymers have a longer mesochain, as the value of the pentad tacticity [M$_3$] is smaller. However, when the value of the pentad isotacticity [M$_5$] is extremely large and the value of the pentad tacticity [M$_3$] is extremely small, a propylene polymer having a larger value of the pentad tacticity [M$_3$] may have a longer mesochain with the proviso that the value of the pentad isotacticity [M$_5$] is almost the same.

For example, when a propylene polymer having the following structure (a) is compared with a propylene polymer having the following structure (b), the propylene polymer of the structure (a) has the M$_3$ structure and a longer mesochain than the propylene polymer of the structure (b) not having the M$_3$ structure. (In this example, it is presumed that each of the structures (a) and (b) is composed of 1,003 propylene units.)

Structure (a)

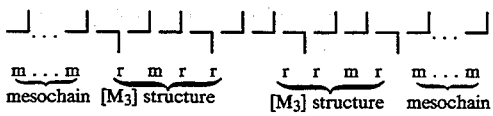

Structure (b)

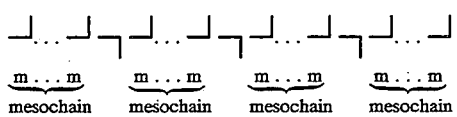

The pentad isotacticity [M₅] of the propylene polymer represented by the structure (a) is 0.986, and the pentad isotacticity [M₅] of the propylene polymer represented by the structure (b) is 0.985, both values being almost the same. However, in the propylene polymer of the structure (a) having the M₃ structures, the mesochains contain 497 propylene units on an average, while in the propylene polymer of the structure (b) not having the M₃ structure, the mesochains contain 250 propylene units on an average. That is, in the propylene polymer having an extremely large value of the pentad isotacticity [M₅], a proportion of the structures represented by "r" (racemo) contained in the propylene unit sequence is extremely small. Hence, such propylene polymer containing a large number of structures "r" (racemo), i.e., propylene polymer having the M₃ structures, has longer mesochains as compared with the propylene polymer containing only few structures "r" (racemo), i.e., propylene polymer not having the M₃ structures.

The propylene polymer [A] for use in the invention is a highly crystalline polypropylene having the M₃ structures as represented by the above structure (a), and in this polymer, the pentad isotacticity [M₅] of the boiling heptane-insoluble component is in the range of 0.970 to 0.995, and the pentad tacticity [M₃] of the boiling heptane-insoluble component is in the range of 0.0020 to 0.0050. Such propylene polymer of the invention has higher rigidity, heat resistance and moisture resistance than those of conventional highly crystalline polypropylenes.

If the pentad tacticity [M₃] of the boiling heptane-insoluble component is out of the range of 0.0020 to 0.0050, the above-mentioned properties may be deteriorated.

In the propylene polymer [A] used for the invention, the boiling heptane-insoluble component has a crystallinity, as measured by X-ray diffractometry, of usually not less than 60%, preferably not less than 65%, more preferably not less than 70%.

The X-ray diffractometry may be carried out as follows. A sample of the boiling heptane-insoluble component is molded into a square plate having a thickness of 1 mm by the use of a pressure molding machine at 180° C., and immediately the plate is water cooled to obtain a pressed sheet. The pressed sheet is measured in its crystallinity by the use of a measuring apparatus (Rotor Flex RU300 produced by Rigaku Denki K.K.) (output: 50 kV, 250 mA). In this measurement, a transmission method is utilized, and the measurement is conducted with rotating the sample.

(4) Melt Flow Rate

The propylene polymer [A] used for the invention has a melt flow rate (MFR), as measured in accordance with ASTM D-1238 at 230° C. under a load of 2.16 kg, of 5 to 50 g/10 min, preferably 7 to 40 g/10 min.

(5) 23° C. n-Decane-soluble Component

It is desired that the propylene polymer [A] for use in the invention contains a 23° C. n-decane-soluble component in an amount of not more than 3.0% by weight, preferably not more than 2.0% by weight, more preferably not more than 1.5% by weight, particularly preferably not more than 1.2% by weight.

The amount of the 23° C. n-decane-soluble component contained in the propylene polymer [A] is determined as follows. That is, a 1-liter flask equipped with a stirrer is charged with 3 g of a polymer sample, 20 mg of 2,6-di-tert-butyl-4-methylphenol and 500 ml of n-decane, and heated at 145° C. in an oil bath to dissolve the polymer sample. After the polymer sample is dissolved, the resulting solution is cooled to room temperature over a period of about 8 hours, followed by keeping it for 8 hours in a water bath of 23° C. so as to precipitate a polymer. The resulting n-decane suspension is filtered through a glass filter of G-4 (or G-2) to separate into the precipitated polymer and the dissolved polymer. The resulting polymer solution is dried at 150° C. and 10 mmHg until a constant weight is reached, and the weight is measured, which is the amount of the polymer component which is soluble in the above mixed solvent. The amount of the 23° C. n-decane-soluble component is expressed by a percentage of the weight thus measured to the weight of the polymer sample.

On the other hand, the 23° C. n-decane-insoluble component of the propylene polymer [A] desirably has a semi-crystallization period at 135° C. of not longer than 100 seconds, preferably not longer than 80 seconds, more preferably not longer than 70 seconds.

In the present invention, the semi-crystallization period at 135° C. of the 23° C. n-decane-insoluble component of the propylene polymer [A] is determined as follows. That is, a relation between an exotherm caused by the crystallization at 135° C. of the 23° C. n-decane-insoluble component of the polymer [A] and a period required for the crystallization is measured by the use of a differential calorimeter produced by Perkin Elmer Co., and a period of time necessary for the exotherm to reach 50% of the whole exotherm is defined as the semi-crystallization period.

In the propylene polymer [A] used for the invention, it is desired that a difference between the melting point of the 23° C. n-decane-insoluble component and the crystallization temperature thereof is not more than 45° C., preferably not more than 43° C., more preferably not more than 40° C.

(6) Intrinsic Viscosity [η]

The propylene polymer [A] for use in the invention desirably has an intrinsic viscosity [η], as measured in decahydronaphthalene at 135° C., of usually 30 to 0.001 dl/g, preferably 10 to 0.01 dl/g, particularly preferably 5 to 0.05 dl/g.

(7) Density

The propylene polymer [A] for use in the invention desirably has a density of 0.900 to 0.936 g/cm³, preferably 0.910 to 0.936 g/cm³.

(8) Constituent Unit Other Than Propylene Unit

The propylene polymer [A] for use in the invention desirably contains constituent units derived from a compound represented by the following formula (i) or (ii) in an amount of 0.015 to 0.035% by mol.

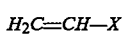  (i)

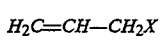  (ii)

wherein X is a cycloalkyl group, an aryl group or

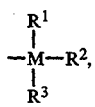

M is carbon or silicon, $R^1$ and $R^2$ are each a hydrocarbon group, and $R^3$ is hydrogen or a hydrocarbon group.

In the above formulae (i) and (ii), examples of the cycloalkyl group X include cyclopentyl, cyclohexyl, cycloheptyl, and examples of the aryl group X include phenyl, tolyl, xylyl and naphthyl.

Examples of the hydrocarbon groups $R^1$, $R^2$ and $R^3$ include an alkyl group such as methyl, ethyl, propyl and butyl; an aryl group such as phenyl and naphthyl; and a bicycloalkyl group such as a norbornyl group. The hydrocarbon groups $R^1$, $R^2$ and $R^3$ may contain silicon and halogen, respectively.

Particular examples of the compound represented by the formulae (i) and (ii) include 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane and allyltrialkylsilanes.

Of these, preferred are 3-methyl-1-butene, 3-methyl-1-pentene, 3-ethyl-1-pentene, vinylcyclohexane, allyltrimethylsilane and dimethylstyrene. More preferred are 3-methyl-1-butene, vinylcyclohexane and allyltrimethylsilane. Particularly preferred is 3-methyl-1-butene.

These compounds may be used in combination of two or more kinds.

It is preferred that the propylene polymer used in the invention contains the constituent unit derived from the compound represented by the above formula (i) or (ii) as a prepolymer.

The propylene polymer used for the invention comprises the constituent units derived from propylene, and optionally the compound represented by the above formula (i) or (ii) in the specific amount as described above, but it may further contain constituent units derived from other polymerizable monomers in extremely small amounts, with the proviso that the object of the invention is not marred.

Preparation of Propylene Polymer [A]

The propylene polymer [A] for use in the invention can be prepared by, for example, polymerizing propylene in the presence of an olefin polymerization catalyst formed from:

[I] a solid titanium catalyst component containing magnesium, titanium, halogen and an electron donor as its essential components,

[II] an organometallic catalyst component, and

[III] a silicon compound represented by the following formula (iii):

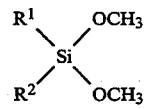

wherein $R^1$ and $R^2$ are each independently a cyclopentyl group, a substituted cyclopentyl group, a cyclopentenyl group, a substituted cyclopentenyl group, a cyclopentadienyl group, a substituted cyclopentadienyl group or a hydrocarbon group whose carbon adjacent to Si is secondary or tertiary carbon.

FIG. 1 illustrates steps of a process for preparing the olefin polymerization catalyst which is used for preparing the propylene polymer [A] for use in the invention.

The components for forming the olefin polymerization catalyst used for preparing the propylene polymer which is used in the invention are now described in detail.

The solid titanium catalyst component [I] can be prepared by bringing a magnesium compound, a titanium compound and an electron donor described below into contact with each other.

The titanium compound used for preparing the solid titanium catalyst component [I] includes, for example, tetravalent titanium compounds represented by the following formula:

$$Ti(OR)_g X_{4-g}$$

wherein R is a hydrocarbon group, X is a halogen atom, and g is a number satisfying the condition of $0 \leq g \leq 4$.

Specifically, the titanium compounds include:

titanium tetrahalides, such as $TiCl_4$, $TiBr_4$ and $TiI_4$;

alkoxytitanium trihalides, such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}iso\text{-}C_4H_9)Br_3$;

dialkoxytitanium dihalides, such as $Ti(OCH_3)_2Cl_2$, $Ti(OC_2H_5)_2Cl_2$, $Ti(O\text{-}n\text{-}C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(O\text{-}n\text{-}C_4H_9)_3Cl$ and $Ti(OC_2H_5)_3Br$; and tetraalkoxytitaniums, such as $Ti(OCH_3)_4$, $Ti(OC_2H_5)_4$, $Ti(O\text{-}n\text{-}C_4H_9)_4$, $Ti(O\text{-}iso\text{-}C_4H_9)_4$ and $Ti(O\text{-}2\text{-}ethylhexyl)$.

Of these, preferred are halogen-containing compounds, more preferred are titanium tetrahalides, and particularly preferred is titanium tetrachloride. These titanium compounds may be used singly or in combination. Further, they may be diluted with hydrocarbon compounds or halogenated hydrocarbon compounds.

The magnesium compound used for preparing the solid titanium catalyst component [I] includes those having reducing property as well as those not having reducing property.

The magnesium compound having reducing property may have a magnesium-to-carbon bond or a magnesium-to-hydrogen bond. Specifically, the magnesium compounds having reducing property include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxylmagnesium, ethylbutylmagnesium and butylmagnesium hydride. These magnesium compounds may be used singly or in combination, or may be used in the form of complex compounds with organometallic compounds described later. Further, these magnesium compounds may be liquid or solid, and may be derived by the reaction of metallic magnesium with a corresponding compound. Furthermore, they may be derived from metallic magnesium during the preparation of the catalyst using the above method.

Examples of the magnesium compounds not having reducing property include magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; aryloxymagnesium halides such as phenoxymagnesium chloride and methylphenoxymagnesium chloride; alkoxymagnesiums such as ethoxymagnesium, isopropoxymagnesium, butoxymagnesium, n-octoxymagnesium and 2-ethylhexoxymagnesium; aryloxymagnesiums such as phenoxymagnesium and dimethylphenoxymagnesium; and magnesium carboxylates such as magnesium laurate and magnesium stearate.

These magnesium compounds not having reducing property may be those derived from the above-mentioned magnesium compounds having reducing property or those derived during the preparation of the catalyst component. In order to derive the magnesium compound not having reducing property, the magnesium compound having reducing property may be brought into contact with a halogen or a compound having an active carbon-to-oxygen bond such as a polysiloxane compound, a halogen-containing silane compound, a halogen-containing aluminum compound, alcohol, ester, ketone and aldehyde.

Besides those magnesium compounds mentioned above, there can be used complex compounds or double compounds of these magnesium compounds with other metals, or mixtures of these magnesium compounds with other metallic compounds. The magnesium compounds may be used in combination of two or more kinds.

Various magnesium compounds other than those mentioned above can also be used for preparing the solid titanium catalyst component [I], but it is preferred that the magnesium compound is present in the form of a halogen-containing magnesium compound in the solid titanium catalyst component [I] finally obtained. Accordingly, if a magnesium compound not containing halogen is used, the compound is preferably brought into contact with a halogen-containing compound in the course of the catalyst preparation.

Of the above-mentioned magnesium compounds, preferred are magnesium compounds not having reducing property. More preferred are halogen-containing magnesium compounds. Particularly preferred are magnesium chloride, alkoxymagnesium chloride and aryloxymagnesium chloride.

The solid titanium catalyst component [I] used in the invention is formed by bringing such a magnesium compound as mentioned above into contact with the aforesaid titanium compound and an electron donor.

Examples of the electron donor used for preparing the solid titanium catalyst component [I] include:

amines, such as methylamine, ethylamine, dimethylamine, diethylamine, ethylenediamine, tetramethylenediamine, hexamethylenediamine, tributylamine and tribenzylamine;

pyrroles, such as pyrrole, methylpyrrole and dimethylpyrrole;

pyrroline;

pyrrolidine;

indole;

pyridines, such as pyridine, methylpyridine, ethylpyridine, propylpyridine, dimethylpyridine, ethylmethylpyridine, trimethylpyridine, phenylpyridine, benzylpyridine and pyridine chloride;

nitrogen-containing cyclic compounds, such as piperidines, quinolines and isoquinolines;

oxygen-containing cyclic compounds, such as tetrahydrofuran, 1,4-cineol, 1,8-cineol, pinolfuran, methylfuran, dimethylfuran, diphenylfuran, benzofuran, coumaran, phthalan, tetrahydropyran, pyran and dihydropyran;

alcohols of 1 to 18 carbon atoms, such as methanol, ethanol, propanol, pentanol, hexanol, octanol, 2-ethylhexanol, dodecanol, octadecyl alcohol, oleyl alcohol, benzyl alcohol, phenylethyl alcohol, cumyl alcohol, isopropyl alcohol and isopropylbenzyl alcohol;

phenols of 6 to 20 carbon atoms which may have lower alkyl group, such as phenol, cresol, xylenol, ethylphenol, propylphenol, nonylphenol, cumylphenol and naphthol;

ketones of 3 to 15 carbon atoms, such as acetone, methyl ethyl ketone, methyl isobutyl ketone, acetophenone, benzophenone, acetylacetone and benzoquinone;

aldehydes of 2 to 15 carbon atoms, such as acetaldehyde, propionaldehyde, octylaldehyde, benzaldehyde, tolualdehyde and naphthaldehyde;

organic esters of 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, n-butyl maleate, diisobutyl methylmalonate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate, $\gamma$-butyrolactone, $\delta$-valerolactone, coumarin, phthalide and ethyl carbonate;

ethers of 2 to 20 carbon atoms, such as methyl ether, ethyl ether, isopropyl ether, butyl ether, amyl ether, anisole and diphenyl ether epoxy-p-menthane;

diethers, such as 2-isopentyl-2-isopropyl-1,3-dimethoxypropane, 2,2-isobutyl-1,3-dimethoxypropane, 2,2-isoproyl-1,3-dimethoxypropane, 2-cyclohexylmethyl-2-isopropyl-1,3-dimethoxypropane, 2,2-isopentyl-1,3-dimethoxypropane, 2-isobutyl-2-isopropyl-1,3-dimethoxypropane, 2-cyclohexyl-2-isopropyl-1,3-dimethoxypropane, 2-cyclopentyl-2-isopropyl-1,3-dimethoxypropane, 2,2-dicyclopentyl-1,3-dimethoxypropane, 1,2-bis-methoxymethyl-bicyclo-[2,2,1]-heptane, diphenyldimethoxysilane, isopropyl-t-butyldimethoxysilane, 2,2-diisobutyl-1,3-dimethoxyhexane and 2-isopentyl-2-isopropyl-1,3-dimethoxycylohexane;

acid amides, such as acetamide, benzamide and toluamide;

nitriles, such as acetonitrile, benzonitrile and tolunitrile; and acid anhydrides, such as acetic anhydride, phthalic anhydride and benzoic anhydride.

Also employable as the electron donor is a silicon compound represented by the formula (iii) described later.

When the titanium compound, the magnesium compound and the electron donor are brought into contact with each other, a carrier compound may be used to prepare a solid titanium catalyst component [I] supported on a carrier.

Examples of the carrier compounds include $Al_2O_3$, $SiO_2$, $B_2O_3$, MgO, CaO, $TiO_2$, ZnO, $ZnO_2$, $SnO_2$, BaO, ThO and resins such as a styrene/divinylbenzene copolymer. Of these carrier compounds, preferred are $SiO_2$, $Al_2O_3$, MgO, ZnO and $ZnO_2$.

The above-mentioned components may be contacted in the presence of other reagents such as silicon, phosphorus and aluminum.

The solid titanium catalyst component [I] can be prepared by bringing the titanium compound, the magnesium compound and the electron donor into contact with each other, wherein any one of conventionally known processes may be employed.

Some examples of the known processes for preparing the solid titanium catalyst component [I] are briefly described below.

(1) A process comprising contacting a solution consisting of a magnesium compound, an electron donor and a hydrocarbon solvent with a titanium compound after or simultaneously with precipitating a solid by contacting the solution with an organometallic compound.

(2) A process comprising contacting a complex composed of a magnesium compound and an electron donor with an organometallic compound and then contacting the reaction product with a titanium compound.

(3) A process comprising contacting a reaction product of an inorganic carrier and an organomagnesium compound with a titanium compound and preferably together with an electron donor. In this process, the reaction product may be beforehand contacted with a halogen-containing compound and/or an organometallic compound.

(4) A process comprising obtaining an inorganic or organic carrier on which a magnesium compound is supported from a mixture of an inorganic or organic carrier and a solution containing a magnesium compound and an electron donor, and optionally a hydrocarbon solvent, and then contacting the resulting carrier with a titanium compound.

(5) A process comprising contacting a solution containing a magnesium compound and an electron donor, and optionally a hydrocarbon solvent, with an inorganic or organic carrier to obtain a solid titanium catalyst component on which magnesium and titanium are supported.

(6) A process comprising contacting a liquid organomagnesium compound with a halogen-containing titanium compound. In this process, an electron donor is used at least once.

(7) A process comprising contacting a liquid organomagnesium compound with a halogen-containing titanium compound and then contacting the reaction product with a titanium compound. In this process, an electron donor is used at least once.

(8) A process comprising contacting an alkoxy group-containing magnesium compound with a halogen-containing titanium compound. In this process, an electron donor is used at least once.

(9) A process comprising contacting a complex composed of an alkoxy group-containing magnesium compound and an electron donor with a titanium compound.

(10) A process comprising contacting a complex composed of an alkoxy group-containing magnesium compound and an electron donor with a titanium compound and then contacting the reaction product with a titanium compound.

(11) A process comprising contacting a magnesium compound, an electron donor and a titanium compound in an optional order. In this reaction, each components may be pretreated with an electron donor and/or a reaction assistant such as an organometallic compound or a halogen-containing silicon compound. In this process, it is preferred to use the electron donor at least once.

(12) A process comprising contacting a liquid magnesium compound having no reducing ability with a liquid titanium compound, preferably in the presence of an electron donor, to precipitate a solid magnesium/titanium complex compound.

(13) A process comprising further contacting the reaction product obtained in the process (12) with a titanium compound.

(14) A process comprising further contacting the reaction product obtained in the process (11) or (12) with an electron donor and a titanium compound.

(15) A process comprising pulverizing a magnesium compound and a titanium compound, and optionally an electron donor, to give a solid and treating the solid with either halogen, a halogen compound or aromatic hydrocarbon. This process may include a step of pulverizing only a magnesium compound, a step of pulverizing a complex composed of a magnesium compound and an electron donor, or a step of pulverizing a magnesium compound and a titanium compound. Further, after the pulverization, the solid may be pretreated with a reaction assistant and then treated with halogen or the like. Examples of the reaction assistants include an organometallic compound and a halogen-containing silicon compound.

(16) A process comprising pulverizing a magnesium compound and then contacting the pulverized compound with a titanium compound. In this process, an electron donor or a reaction assistant is preferably used in the pulverization stage and/or the contacting stage.

(17) A process comprising treating the compound obtained in any of the processes (11) to (16) with halogen, a halogen compound or aromatic hydrocarbon.

(18) A process comprising contacting the reaction product of a metal oxide, an organomagnesium compound and a halogen-containing compound with a titanium compound and if necessary an electron donor.

(19) A process comprising contacting a magnesium compound such as a magnesium salt of organic acid, alkoxymagnesium or aryloxymagnesium with a titanium compound and/or halogen-containing hydrocarbon and if necessary an electron donor.

(20) A process comprising contacting a hydrocarbon solution containing at least a magnesium compound and alkoxytitanium with a titanium compound and/or an electron donor. In this process, a halogen-containing compound such as a halogen-containing silicon compound is preferably allowed to coexist.

(21) A process comprising reacting a liquid magnesium compound having no reducing ability with an organometallic compound to precipitate a solid magnesium/metal (aluminum) complex compound and then contacting the resulting compound with an electron donor and a titanium compound.

The amounts of each components used for preparing the solid titanium catalyst component [I] vary depending on the process used, and cannot be defined in general. However, for example, the electron donor is used in an amount of 0.01 to 5 mol, preferably 0.1 to 1 mol, and the titanium compound is used in an amount of 0.01 to 1,000 mol, preferably 0.1 to 200 mol, both based on 1 mol of the magnesium compound.

The solid titanium catalyst component [I] obtained as above contains, as its essential ingredients, magnesium, titanium, halogen and an electron donor.

In this solid titanium catalyst component [I], an atomic ratio of halogen/titanium is about 2 to 200, preferably about 4 to 100; a molar ratio of the electron donor/titanium is about 0.01 to 100, preferably about 0.2 to 10; and an atomic ratio of magnesium/titanium is about 1 to 100, preferably about 2 to 50.

As the organometallic catalyst component [II], organometallic compounds of metals belonging to Group I to III of the periodic table are employable, and examples thereof include:

[II-1] organoaluminum compounds represented by the following formula $$R^1_m Al(OR^2)_n H_p X_q$$

wherein $R^1$ and $R^2$ are each a hydrocarbon group having usually 1 to 15 carbon atoms, preferably 1 to 4 carbon atoms, $R^1$ and $R^2$ my be the same or different from each other, X is a halogen atom, and m, n, p and q are numbers satisfying the conditions of $0 < m \leq 3$, $0 \leq n < 3$, $0 \leq p < 3$, $0 \leq q < 3$ and $m+n+p+q=3$;

[II-2] alkyl complex compounds of aluminum and Group I metals, represented by the following formula $$M^1 Al R^1_4$$

wherein $M^1$ is Li, Na or K, and $R^1$ is the same as defined above; and

[II-3] dialkyl compounds of Group II or III metals, represented by the following formula $$R^1 R^2 M^2$$

wherein $R^1$ and $R^2$ are the same as defined above, and $M^2$ is Mg, Zn or Cd.

Examples of the organoaluminum compounds [II-1] include:

compounds of the formula $R^1_m Al(OR^2)_{3-m}$ wherein $R^1$ and $R^2$ are the same as defined above, and m is preferably a number satisfying the condition of $1.5 \leq m \leq 3$;

compounds of the formula $R^1_m Al X_{3-m}$ wherein $R^1$ is the same as defined above, X is halogen, and m is preferably a number satisfying the condition of $0 < m < 3$;

compounds of the formula $R^1_m Al H_{3-m}$ wherein $R^1$ is the same as defined above, and m is preferably a number satisfying the condition of $2 \leq m < 3$; and compounds of the formula $R^1_m Al(OR^2)_n X_q$ wherein $R^1$ and $R^2$ are the same as defined above, X is halogen, and m, n, and q are numbers satisfying the conditions of $0 < m \leq 3$, $0 \leq n < 3$, $0 \leq q < 3$ and $m+n+q=3$.

More specifically, examples of the aluminum compounds II-1] include:

trialkylaluminums, such as triethylaluminum and tributylaluminum;

trialkenylaluminums, such as triisoprenylaluminum;

dialkylaluminum alkoxides, such as diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums, such as those having an average composition represented by, for example, the formula $R^1_{2.5} Al(OR^2)_{0.5}$ dialkylaluminum halides, such as diethylaluminum chloride, dibutylaluminum chloride and diethylaluminum bromide;

alkylaluminum sesquihalides, such as ethylaluminum sesquichloride, butylaluminum sesquichloride and ethylaluminum sesquibromide;

partially halogenated alkylaluminums, such as alkylaluminum dihalides, e.g., ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, such as alkylaluminum dihydrides, e.g., ethylaluminum dihydride and propylaluminum dihydride; and partially alkoxylated and halogenated alkylalumiums, such as ethylaluminum ethoxychloride, butylaluminum butoxychloride and ethylaluminum ethoxybromide.

The analogues to the compounds [II-1] are, for example, organoaluminum compounds in which two or more aluminum atoms are linked through an oxygen atom or a nitrogen atom. Examples of such compounds include: $(C_2H_5)_2AlOAl(C_2H_5)_2$, $(C_4H_9)_2AlOAl(C_4H_9)_2$, $(C_2H_5)_2AlN(C_2H_5)Al(C_2H_5)_2$, and aluminoxanes such as methylaluminoxane.

Examples of the alkyl complex compounds [II-2] include:
$LiAl(C_2H_5)_4$, and
$LiAl(C_7H_{15})_4$.

Of the above-exemplified compounds, preferably used are organoaluminum compounds, particularly, halogen-containing alkylaluminum compounds.

The silicon compound [III] used for the invention is a compound represented by the following formula (iii):

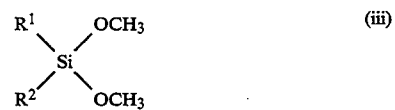

wherein $R^1$ and $R^2$ are each independently a cyclopentyl group, a substituted cyclopentyl group, a cyclopentenyl group, a substituted cyclopentenyl group, a cyclopentadienyl group, a substituted cyclopentadienyl group or a hydrocarbon group whose carbon adjacent to Si is secondary carbon or tertiary carbon.

The substituted cyclopentyl group is, for example, a cyclopentyl group having an alkyl group, and particular examples thereof include 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl.

The substituted cyclopentenyl group is, for example, a cyclopentenyl group having an alkyl group, and particular examples thereof include 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclopentenyl, 2,3,4-trimethylcyclopentenyl, 2,3,5-trimethylcyclopentenyl, 2,3,4-triethylcyclopentenyl, tetramethylcyclopentenyl and tetraethylcyclopentenyl.

The substituted cyclopentadienyl group is, for example, a cyclopentadienyl group having an alkyl group, and particular examples thereof include 2-methylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

Examples of the hydrocarbon group in which the carbon adjacent to Si is secondary carbon includes i-propyl, s-butyl, s-amyl and α-methylbenzyl; and examples of the hydrocarbon group in which the carbon adjacent to Si is tertiary carbon includes t-butyl, t-amyl, α,α'-dimethylbenzyl and adamantyl.

Particular examples of the silicon compounds represented by the formula (iii) include dicyclopentyldimethoxysilane, dicyclopentenyldimethoxysilane, dicyclopentadienyldimethoxysilane, di-t-butyldimethoxysilane, di(2-methylcyclopentyl)dimethoxysilane, di(3-methylcyclopentyl)dimethoxysilane, di(2-ethylcyclopentyl)dimethoxysilane, di(2,3-dimethylcyclopentyl)dimethoxysilane, di(2,4-dimethylcyclopentyl)dimethoxysilane, di(2,5-dimethylcyclopentyl)dimethoxysilane, di(2,3-diethylcyclopentyl)dimethoxysilane, di(2,3,4-trimethylcyclopentyl)dimethoxysilane, di(2,3,5-trimethylcyclopentyl)dimethoxysilane, di(2,3,4-triethylcyclopentyl)dimethoxysilane, di(tetramethylcyclopentyl)dimethoxysilane, di(tetraethylcyclopentyl)dimethoxysilane, di(2-methylcyclopentenyl)dimethoxysilane, di(3-methylcyclopentenyl)dimethoxysilane, di(2-ethylcyclopentenyl)dimethoxysilane, di(2-n-butylcyclopentenyl)dimethoxysilane, di(2,3-dimethylcyclopentenyl)dimethoxysilane, di(2,4-dimethylcyclopentenyl)dimethoxysilane, di(2,5-dimethylcyclopentenyl)dimethoxysilane, di(2,3,4-trimethylcyclopentenyl)dimethoxysilane, di(2,3,5-trimethylcyclopentenyl)dimethoxysilane, di(2,3,4-triethylcyclopentenyl)dimethoxysilane, di(tetramethylcyclopentenyl)dimethoxysilane, di(tetraethylcyclopentenyl)dimethoxysilane, di(2-methylcyclopentadienyl)dimethoxysilane, di(3-methylcyclopentadienyl)dimethoxysilane, di(2-ethylcyclopentadienyl)dimethoxysilane, di(2-n-butylcyclopentadienyl)dimethoxysilane, di(2,3-dimethylcyclopentadienyl)dimethoxysilane, di(2,4-dimethylcyclopentadienyl)dimethoxysilane, di(2,5-dimethylcyclopentadienyl)dimethoxysilane, di(2,3-diethylcyclopentadienyl)dimethoxysilane, di(2,3,4-trimethylcyclopentadienyl)dimethoxysilane, di(2,3,5-trimethylcyclopentadienyl)dimethoxysilane, di(2,3,4-triethylcyclopentadienyl)dimethoxysilane, di(2,3,4,5-tetramethylcyclopentadienyl)dimethoxysilane, di(2,3,4,5-tetraethylcyclopentadienyl)dimethoxysilane, di(1,2,3,4,5-pentamethylcyclopentadienyl)dimethoxysilane, di(1,2,3,4,5-pentaethylcyclopentadienyl)dimethoxysilane, di-t-amyldimethoxysilane, di(α,α'-dimethylbenzyl)dimethoxysilane, di(adamantyl)dimethoxysilane, adamantyl-t-butyldimethoxysilane, cyclopentyl-t-butyldimethoxysilane, di-isopropyldimethoxysilane, di-s-butyldimethoxysilane, di-s-amyldimethoxysilane and isopropyl-s-butyldimethoxysilane.

Of these, preferred are dicyclopentyldimethoxysilane, di-t-butyldimethoxysilane, di(2-methylcyclopentyl)dimethoxysilane, di(3-methylcyclopentyl)dimethoxysilane and di-t-amyldimethoxysilane. Particularly preferred are dicyclopentyldimethoxysilane and di-t-butyldimethoxysilane.

The propylene polymer for use in the invention is prepared by polymerizing propylene in the presence of the olefin polymerization catalyst formed from the solid titanium catalyst component [I], the organometallic catalyst component [II] and the silicon compound [III].

In the present invention, a prepolymerized catalyst may be used for the polymerization of propylene, which may be obtained by prepolymerizing at least an olefin in the presence of the solid titanium catalyst component [I] and the organometallic catalyst component [II].

In the prepolymerization, an olefin represented by the following formula (i) or (ii) may preferably be used.

$$H_2C=CH-X \quad (i)$$

$$H_2C=CH-CH_2X \quad (ii)$$

wherein X is a cycloalkyl group, an aryl group or

$$-\underset{\underset{R^3}{|}}{\overset{\overset{R^1}{|}}{M}}-R^2,$$

M is carbon or silicon, $R^1$ and $R^2$ are each a hydrocarbon group, and $R^3$ is hydrogen or a hydrocarbon group.

Examples of the olefins represented by the formulae (i) and (ii) include 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane and allytrialkylsilanes.

Of these, preferred are 3-methyl-1-butene, 3-methyl-1pentene, 3-ethyl-1-hexene, vinylcyclohexane, allyltrimethylsilane, dimethylstyrene and propylene; more preferred are 3-methyl-1-butene, vinylcyclohexane and allyltrimethylsilane; and particularly preferred is 3-methyl-1-butene. These olefins may be used in combination of two or more kinds.

In the present invention, it is preferred to use the olefin represented by the formula (i) or (ii) in the prepolymerization in such an amount that the constituent units derived from this olefin are contained in the resulting propylene polymer [A] in an amount of 0.005 to 0.05% by mol, preferably 0.015 to 0.035% by mol, as described above.

The catalyst concentration in the prepolymerization system can be higher than that in the system of polymerization of propylene.

In the prepolymerization, the solid titanium catalyst component [I] is desirably used in a concentration of usually about 0.01 to 200 mmol, preferably about 0.05 to 100 mmol in terms of titanium atom, based on 1 liter of an inert hydrocarbon medium as described later.

The organometallic catalyst component [II] is used in an amount of usually about 0.1 to 100 mmol, preferably about 0.5 to 50 mmol, based on 1 mol of titanium atom in the solid titanium catalyst component [I].

In the prepolymerization, an electron donor (c) may be used together with the solid titanium catalyst component [I] and the organometallic catalyst component [II].

The electron donor (c) employable for the prepolymerization includes the aforesaid silicon compound [III] which is used for forming the olefin polymerization catalyst, the aforesaid electron donor which is used for preparing the solid titanium catalyst component [I], and an organosilicon compound represented by the following formula (c-i):

$$R_nSi(OR')_{4-n} \quad \text{(c-i)}$$

wherein R and R' are each a hydrocarbon group, and n is a number satisfying the condition of $0<n<4$.

Examples of the organosilicon compounds represented by the formula (c-i) include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, norbornanetriethoxysilane, 2-norbornanemethyldimethoxysilane, ethyl silicate, butyl silicate, trimethylphenoxysilane, methyltriallyloxysilane, vinyltris (β-methoxyethoxysilane), vinyltriactoxysilane and dimethyltetraethoxydisiloxane.

Also employable as the electron donor (c) is an organosilicon compound represented by the following formula (c-ii):

$$SiR^1R^2{}_m(OR^3)_{3-m} \quad \text{(c-ii)}$$

wherein $R^1$ is a cyclopentyl group or a cyclopentyl group having an alkyl group, $R^2$ is selected from an alkyl group, a cyclopentyl group and a cyclopentyl group having an alkyl group, $R^3$ is a hydrocarbon group, m is a number satisfying the condition of $0 \leq m \leq 2$.

In the formula (c-ii), $R^1$ is a cyclopentyl group or a cyclopentyl group having an alkyl group. The cyclopentyl group having an alkyl group includes, for example, 2-methylcyclopentyl, 3-methylcyclopentyl and 2-ethylcyclopentyl, 2,3-dimethylcyclopentyl.

In the formula (c-ii), $R^2$ is any one of an alkyl group, a cyclopentyl group and a cyclopentyl group having an alkyl group. More specifically, examples of $R^2$ include an alkyl group such as methyl, ethyl, propyl, isopropyl, butyl and hexyl, and the cyclopentyl group and the cyclopentyl group having an alkyl group which are exemplified above with respect to $R^1$.

In the formula (c-ii), $R^3$ is a hydrocarbon group, e.g., an alkyl group, a cycloalkyl group, an aryl group and an aralkyl group.

Examples of such organosilicon compounds include:
trialkoxysilanes, such as cyclopentyltrimethoxysilane, 2-methylcyclopentyltrimethoxysilane, 2,3-dimethylcyclopentyltrimethoxysilane and cyclopentyltriethoxysilane;

dialkoxysilanes, such as dicyclopentyldimethoxysilane, bis(2-methylcyclopentyl)dimethoxysilane, bis(2,3-dimethylcyclopentyl)dimethoxysilane and dicyclopentyldiethoxysilane; and monoalkoxysilanes, such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane.

In the preparation of the prepolymerized catalyst, the electron donor (c) is used in an amount of usually 0.1 to 50 mol, preferably 0.5 to 30 mol, more preferably 1 to 10 mol, based on 1 mol of titanium atom in the solid titanium catalyst component [I].

It is desired that the prepolymerization is carried out under mild conditions by adding the olefin represented by the formula (i) or (ii) and the catalyst components to an inert hydrocarbon solvent.

Examples of the inert hydrocarbon solvents used herein include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures of these hydrocarbons. Of these inert hydrocarbon solvents, particularly preferred are aliphatic hydrocarbons.

There is no specific limitation on the reaction temperature for the prepolymerization, so far as the resulting prepolymer is not substantially dissolved in the inert hydrocarbon solvent. In general, the temperature is in the range of about $-20°$ to $+100°$ C., preferably about $-20°$ to $+80°$ C., more preferably $0°$ to $+40°$ C.

A molecular weight regulator such as hydrogen may be used in the prepolymerization.

The prepolymerization is desirably performed in such a manner that a prepolymer is prepared in an amount of about 0.1 to 1,000 g, preferably about 0.3 to 500 g, based on 1 g of the solid titanium catalyst component [I].

The prepolymerization may be carried out either batchwise, semi-continuously or continuously.

The propylene polymer for use in the invention can be prepared by polymerizing propylene in the presence of the olefin polymerization catalyst formed from the solid titanium catalyst component [I], the organometallic catalyst component [II] and the silicon compound [III] represented by the formula (iii), preferably in the presence of the olefin polymerization catalyst formed from the prepolymerized catalyst obtained as above, the organometallic catalyst component [II] and the silicon compound [III].

In the polymerization of propylene, extremely small amounts of polymerizable monomers other than propylene may be allowed to coexist in the polymerization system.

Examples of polymerizable monomers other than propylene include olefins and diene compounds, more specifically:

olefins of 4 to 20 carbon atoms, such as ethylene, 1-butene, 1-pentene, 1-hexene, 1-octene, 1-decene, 1-dodecene, 1-tetradecene, 1-hexadecene, 1-octadecene, 1-eicosene, cyclopentene, cycloheptene, norbornene, 5-ethyl-2-norbornene, tetracyclododecane, 2-ethyl- 1,4,5,8-dimethano-1,2,3,4,4a,5,8,8a-*octahydronaphthalene*; and diene compounds of 4 to 20 carbon atoms, such as 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidenenorbornene, vinylnorbornene and dicylopentadiene.

Further, the aforesaid olefin represented by the formula (i) or (ii) which is used for preparing the prepolymerized catalyst can be employed.

The polymerization of propylene is generally performed in a gas phase or a liquid phase.

When the polymerization is a slurry polymerization or a solution polymerization, the same inert hydrocarbon as used for preparing the aforesaid prepolymerized catalyst can be employed as a reaction solvent.

In the polymerization, the solid titanium catalyst component [I] or the prepolymerized catalyst is used in an amount of usually about 0.0001 to 50 mmol, preferably about 0.001 to 10 mmol, in terms of titanium atom contained in the solid titanium catalyst component [I] or in the prepolymerized catalyst, based on 1 liter of the polymerization volume. The organometallic catalyst component [II] is used in such an amount that the amount of the metal atom contained in the organometallic catalyst component [II] is in the range of usually about 1 to 2,000 mol, preferably about 2 to 500 mol, based on 1 mol of the titanium atom in the polymerization system. The silicon compound [III] is used in an amount of usually about 0.001 to 50 mol, preferably about 0.01 to 20 mol, in terms of silicon atom contained in the silicon compound [III], based on 1 mol of the metal atom in the organometallic catalyst component [II].

The molecular weight of the resulting polymer can be easily regulated by feeding hydrogen to the polymerization system or removing it therefrom. Even by conducting such operation, the crystallinity and the pentad (iso)tacticity of the resulting polymer are not lowered, and the catalytic activity is not reduced. The amount of hydrogen to be fed varies depending on the polymerization conditions, but in general, hydrogen is fed in such an amount that the polymer finally obtained has a melt flow rate of 0.1 to 2,000 g/10 min.

In the present invention, the temperature for the propylene polymerization is in the range of usually about $-50°$ to $200°$ C., preferably about $20°$ to $100°$ C.; and the pressure therefor is in the range of usually atmospheric pressure to $100$ kg/cm$^2$, preferably about 2 to 50 kg/cm$^2$.

The polymerization may be carried out either batchwise, semi-continuously or continuously.

The propylene polymer for use in the invention can be prepared in two or more stages wherein individual reaction conditions may be the same or different. In this case, the propylene polymer may be prepared in either a gas phase or a liquid phase by the use of 2 to 10 polymerization reactors.

If the propylene polymer is prepared as described above, an yield of the propylene polymer per unit amount of the solid catalyst component can be increased, and hence the amount of the catalyst residue (particularly halogen content) in the propylene polymer can be reduced. Accordingly, an operation for removing the catalyst residue contained in the propylene polymer can be omitted, and moreover, a mold can be effectively prevented from occurrence of rust in the molding process of the propylene polymer.

The propylene polymer as described above has an extremely low content of an amorphous component (rubber component), and therefore has a low content of a hydrocarbon-soluble component. Hence, a molded product produced from this propylene polymer has low surface tackiness.

Propylene Block Copolymer [B]

The propylene block copolymer [B] for use in the invention is a block copolymer comprising propylene polymer units and ethylene/propylene copolymer units.

This propylene block copolymer [B] has the following characteristic properties:

(1) a melt flow rate (MFR) of the copolymer, as measured in accordance with ASTM D-1238 at $230°$ C. under a load of 2.16 kg, is in the range of 10 to 50 g/10 min, preferably 7 to 40 g/10 min, (2) a $23°$ C. n-decane-soluble component is contained in the copolymer in an amount of 5 to 13% by weight, preferably 7 to 10% by weight, and (3) constituent units derived from ethylene are contained in the $23°$ C. n-decane-soluble component in an amount of 30 to 50% by mol, preferably 35 to 45% by mol.

The amount of the $23°$ C. n-decane-soluble component contained in the propylene block copolymer [B] is determined in the following manner. That is, 2 g of a sample (propylene block copolymer) is immersed in 500 g of boiling n-decane to dissolve the sample in n-decane. The resulting solution is then cooled to $23°$ C. to precipitate a solid. The solid is filtered on a G-4 glass filter, and dried to measure the weight of the solid. The amount of the $23°$ C. n-decane-soluble component is expressed by a percentage of the weight thus measured to the weight of the block copolymer.

The content of the constituent units derived from ethylene in the $23°$ C. n-decane-soluble component can be determined by conventional methods such as infrared spectroscopy and NMR spectroscopy.

The propylene block copolymer [B] for use in the invention may be prepared by the use of such an olefin polymerization catalyst as described later. In such propylene block copolymer [B], it is desired that the intrinsic viscosity [$\eta$] of the ethylene/propylene copolymer unit (rubber portion) is high, and more particularly, the intrinsic viscosity [$\eta$] of the $23°$ C. n-decane-soluble component is in the range of 3 to 10 dl/g, preferably 4 to 9 dl/g.

Further, in the propylene block copolymer [B], it is desired that the melt flow rate (MFR) of the propylene polymer unit is high, and more particularly, the melt flow rate of the propylene polymer unit is in the range of 20 to 300 g/10 min, preferably 30 to 200 g/10 min.

The propylene polymer unit of the propylene block copolymer [B] is highly isotactic, and more particularly, it has a pentad isotacticity [$M_5$] of 0.980 to 0.995, preferably 0.982 to 0.985, and a pentad tacticity [$M_3$] of 0.0020 to 0.0050, preferably 0.0025 to 0.0046, the [$M_5$] and [$M_3$] being described before with respect to the propylene polymer [A].

The ethylene/propylene copolymer units (rubber portion) of the propylene block copolymer [B] used for the invention may contain constituent units derived from polymerizable monomers other than ethylene and propylene, with the proviso that the object of the present invention is not marred.

Examples of other polymerizable monomers include α-olefins such as 1-butene, 1-hexene, 1-octene and 4-methyl-1-pentene, vinyl esters such as vinyl acetate, unsaturated organic acids, and derivatives of the unsaturated organic acids such as maleic anhydride.

The propylene block copolymer [B] for use in the invention may be a mixture of propylene block copolymers, one containing a rubber portion comprising a terpolymer of ethylene, propylene and other polymerizable monomer, the other containing a rubber portion comprising a copolymer of ethylene and propylene.

The propylene block copolymer [B] used for the invention can be prepared by the use of an olefin polymerization catalyst as described before in the preparation of the propylene polymer [A]. For example, the propylene block copolymer [B] can be prepared by a two-stage polymerization process comprising initially polymerizing propylene and then polymerizing propylene and ethylene, in the presence of the olefin polymerization catalyst formed from the solid titanium catalyst component [I] (or transition metal compound catalyst component supported on a carrier), the organometallic catalyst component [II] and the silicon compound [III] represented by the formula (iii). In other words, the propylene block copolymer can be prepared by homopolymerizing propylene and then copolymerizing propylene and ethylene, in the presence of the olefin polymerization catalyst.

The olefin polymerization catalyst may be copulverized for the purpose of activating it. In the preparation of the propylene block copolymer [B] using the olefin polymerization catalyst, electron donors other than the silicon compound may also be used.

The olefin polymerization catalyst used for preparing the propylene block copolymer [B] is preferably a prepolymerized catalyst in which the compound represented by the aforesaid formula (i) or (ii) is prepolymerized.

The propylene block copolymer can be prepared by any one of conventionally known processes except that the above-mentioned olefin polymerization catalyst is used. Details of the known processes are described in, for example, Japanese Patent Application No. 338979/1991, Japanese Patent Laid-Open Publication No. 98045/1977 and Japanese Patent Publication No. 26613/1982, all having been applied for patent by the present applicant.

Thermoplastic Elastomer [C]

The thermoplastic elastomer [C] for use in the invention is either a polystyrene.polyethylene/polybutylene.-polystyrene block copolymer, an ethylene/α-olefin random copolymer, or a mixture of these copolymers.

The polystyrene.polyethylene/polybutylene.polystyrene block copolymer (SEBS) [C-1] used in the invention is a thermoplastic elastomer comprising polystyrene block units and polyethylene/butylene rubber block units. In the polystyrene.polyethylene/polybutylene.polystyrene block copolymer, the polystyrene block units, which are hard segments, serve to form physical bridges (domains) which link the rubber block units together. The rubber block units present among the polystyrene block units are soft segments and have elastomeric properties.

The polystyrene.polyethylene/polybutylene.polystyrene block copolymer (SEBS) [C-1] used in the invention contains polystyrene units in an amount of usually 14 to 22% by mol.

The content of the constituent units derived from styrene is determined by conventional methods such as infrared spectroscopy and NMR spectroscopy.

The SEBS [C-1] has a melt flow rate (MFR), as measured in accordance with ASTM D-1238 at 230° C. under a load of 2.16 kg, of 0.1 to 2.0 g/10 min, preferably 0.1 to 1.0 g/10 min.

Further, the SEBS [C-1] has an intrinsic viscosity $[\eta]$, as measured in decahydronaphthalene at 135° C., of usually 0.01 to 10 dl/g, preferably 0.08 to 7 dl/g, a glass transition temperature (Tg) of usually not higher than 0° C., preferably not higher than $-10°$ C., more preferably not higher than $-20°$ C., and a crystallinity, as measured by X-ray diffractometry, of usually 0 to 10%, preferably 0 to 7%, more preferably 0 to 5%.

The SEBS can be prepared by a known process described in, for example, Japanese Patent Publication No. 57463/1985.

Examples of the polystyrene.polyethylene/polybutylene.polystyrene block copolymer (SEBS) include Kraton G1650, G1652, G1657 and G1701 (Trade name, available from Shell Kagaku K.K.) and Toughtec (Trade name, available from Asahi Chemical Industry Co., Ltd.).

The SEBS used in the invention is generally known as a hydrogenated product of SBS (PS/polybutadiene/PS, where PS is polystyrene), which is a styrene/conjugated diene block copolymer. In the invention, SBS, other styrene/conjugated diene block copolymers and fully or partially hydrogenated products thereof are also employable in addition to the SEBS.

Examples of the styrene/conjugated diene block copolymers include SBR (PS/butadiene block copolymer), SBS (PS/polybutadiene/PS), PS/polyisoprene block copolymer, SIS (PS/polyisoprene/PS) and hydrogenated SIS. More specifically, Kraton (available from Shell Kagaku K.K.), Caryflex (available from Shell Kagaku K.K.), Sorprene (Philips Petrolifam Co.), Europrene SOLT (available from Anitch Co.), Toughprene (available from Asahi Chemical Industry Co., Ltd.), Sorprene-T (Nippon Elastomer Co.), JSRTR (available from Japan Synthetic Rubber Co., Ltd.), Denka STR (available from Denki Kagaku Kogyo K.K.), Quintac (Nippon Geon Co., Ltd.), Kraton G (available from Shell Kagaku K.K.) and Toughtec (available from Asahi Chemical Industry Co., Ltd.) may be mentioned.

The ethylene/α-olefin random copolymer used in the invention includes an ethylene/propylene random copolymer [C-2] and an ethylene/1-butene random copolymer [C-3]. The content of the constituent units derived from ethylene in the ethylene/α-olefin random copolymer may be determined by conventional methods such as infrared spectroscopy and NMR spectroscopy.

The ethylene/propylene random copolymer (EPR) [C-2] used in the invention contains constituent units derived from ethylene in an amount of 30 to 60% by mol, preferably 35 to 50% by mol.

The ethylene/propylene random copolymer [C-2] used in the invention has a melt flow rate (MFR), as measured in accordance with ASTM D-1238 at 230° C.

under a load of 2.16 kg, of 0.1 to 20 g/10 min, preferably 0.1 to 1.0 g/10 min.

The ethylene/propylene random copolymer [C-2] used in the invention may further contain constituent units derived from polymerizable monomers other than ethylene and propylene, with the proviso that the object of the invention is not marred.

Examples of other polymerizable monomers include α-olefins such as 1-butene, 1-pentene, 1-hexene and 4-methyl-1-pentene, and dienes such as ethylidenenorbornene, dicyclopentadiene and butadiene.

The ethylene/1-butene random copolymer (EBR) [C-3] used in the invention contains constituent units derived from ethylene in an amount of 95 to 70% by mol, preferably 85 to 75% by mol, and constituent units derived from 1-butene in an amount of 5 to 30% by mol, preferably 15 to 25% by mol.

The ethylene/1-butene random copolymer [C-3] having the above composition has a glass transition temperature of not higher than $-50°$ C., preferably not higher than $-60°$ C.

The ethylene/1-butene random copolymer [C-3] used in the invention has a melt flow rate (MFR), as measured in accordance with ASTM D-1238 at 230° C. under a load of 2.16 kg, of 0.1 to 20 g/10 min, preferably 0.1 to 2.0 g/10 min.

The ethylene/1-butene random copolymer [C-3] has a crystallinity, as measured by X-ray diffractometry, of usually less than 20%, preferably not more than 10%.

It is desired that the ethylene/1-butene random copolymer [C-3] has a parameter (B value), which indicates randomness of a distribution of the copolymerized monomer sequences and is determined by $^{13}$C-NMR, of 1.0 to 1.4.

More specifically, the B value of the ethylene/1-butene random copolymer [C-3] is an index of a distribution of the constituent units derived from each monomers in the copolymer chain, and can be obtained by dividing a molar fraction of the ehtylene-1-butene alternating sequences to all the dyad sequences in the polymer by twice as many the product of the ethylene content (molar fraction) and the 1-butene content (molar fraction). That is, the B value is calculated by the following formula:

$$B = \frac{P_{BE}}{2P_B \cdot P_E}$$

The values for $P_E$, $P_B$ and $P_{BE}$ are determined in the following manner.

In a sample tube having a diameter of 10 mm, about 200 mg of an ethylene/1-butene copolymer is homogeneously dissolved in 1 ml of hexachlorobutadiene, and a $^{13}$C-NMR spectrum of the sample is measured under the following conditions.

Measuring temperature: 120° C.
Measuring frequency: 25.05 MHz
Spectrum width: 1,500 Hz
Filter width: 1,500 Hz
Pulse repetition time: 4.2 sec
Pulse width: 7 μsec
Integrating times: 2,000 to 5,000

The values for $P_E$, $P_B$ and $P_{BE}$ can be determined in accordance with the reports by G. J. Ray (Macromolecules, 10, 773, 1977), J. C. Randall (Macromolecules, 15, 353, 1982, J. Polymer Science, Polymer Physics Ed., 11, 275, 1973), K. Kimura (Polymer, 25, 441, 1984), etc.

If the ethylene/1-butene copolymer is a perfectly alternating copolymer, the B value is 2, while if the ethylene/1-butene copolymer is a perfectly block copolymer, the B value is 0.

A propylene polymer composition containing the ethylene/1-butene random copolymer [C-3] having the B value of less than 1.0 tends to be lowered in the impact resistance.

The above-described ethylene/1-butene random copolymer [C-3] having the B value of 1.0 to 1.4 has good compatibility with the propylene polymer.

The ethylene/1-butene random copolymer [C-3] can be prepared by the use of a vanadium catalyst or a metallocene catalyst conventionally known.

In the present invention, the thermoplastic elastomer [C] may be used in any form of pellet, clump and veil forms, with the proviso that the kneading is smoothly carried out.

Inorganic Filler [D]

Examples of the inorganic filler [D] for use in the invention include fine talc, calcium carbonate, basic magnesium sulfate whisker, calcium titanate whisker and aluminum borate whisker. Of these, fine talc is preferred.

The talc used in the invention desirably has a mean particle diameter of 0.2 to 10 μm, preferably 2 to 5.0 μm.

The mean particle diameter of the talc can be measured by a liquid phase sedimentation method.

In the present invention, talc having a mean aspect ratio (ratio between length and thickness in the longitudinal or crosswise direction) of not less than 3, particularly not less than 4, is preferably used.

The talc for use in the invention may or may not be subjected to surface treatment. Examples of the surface treatments include chemical treatments using various agents such as silane coupling agents, higher fatty acids, metallic salts of fatty acids, unsaturated organic acids, organic titanate, resin acids and polyethylene glycol, and physical treatments.

If talc having been subjected to such surface treatment is used, a propylene polymer composition capable of providing a molded product excellent in weld strength, coating properties and molding processability can be obtained.

Propylene Polymer Composition

The propylene polymer compositions according to the invention each comprises the propylene polymer [A] and the propylene block copolymer [B].

The first propylene polymer composition of the invention comprises the propylene polymer [A] in an amount of 10 to 90% by weight, preferably 10 to 80% by weight, and the propylene block copolymer [B] in an amount of 90 to 10% by weight, preferably 90 to 20% by weight.

The second propylene polymer composition of the invention comprises the propylene polymer [A], the propylene block copolymer [B] and the thermoplastic elastomer [C], and contains the propylene polymer [A] in an amount of 10 to 80% by weight, preferably 20 to 70% by weight, the propylene block copolymer [B] in an amount of 5 to 70% by weight, preferably 7 to 60% by weight, and the thermoplastic elastomer [C] in an amount of 10 to 30% by weight, preferably 15 to 25% by weight.

The third propylene polymer composition of the invention comprises the propylene polymer [A], the propylene block copolymer [B], the thermoplastic elastomer [C] and the inorganic filler [D], and contains the propylene polymer [A] in an amount of 10 to 70% by weight, preferably 20 to 70% by weight, the propylene block copolymer [B] in an amount of 5 to 60% by weight, preferably 7 to 50% by weight, the thermoplastic elastomer [C] in an amount of 15 to 25% by weight, preferably 15 to 22% by weight, and the inorganic filler [D] in an amount of 5 to 15% by weight, preferably 7 to 12% by weight.

Such propylene polymer compositions of the invention as mentioned above are excellent in rigidity and impact resistance as well as in heat resistance.

The propylene polymer compositions according to the invention can be prepared by kneading the propylene polymer [A] and the propylene block copolymer [B], or kneading the polymer [A], the copolymer [B] and the thermoplastic elastomer [C], or kneading the polymer [A], the copolymer [B], the elastomer [C] and the inorganic filler [D], in accordance with kneading methods generally used for resin compositions.

In the kneading, various kneading apparatuses such as a single-screw extruder, a twin-screw extruder, a twin-screw kneader, a Banbury mixer and a roll can be employed.

A kneadate of the propylene polymer composition obtained from the above components is generally pelletized for use.

In the preparation of the propylene polymer compositions of the invention, there in no specific limitation on the order of feeding each components [A], [B], [C] and [D] to the kneading apparatus. Further, the components may be fed simultaneously or separately.

For example, in the preparation of the second propylene polymer composition from the components [A], [B] and [C], it is possible that a master batch composed of the propylene polymer [A], the propylene block copolymer [B] and the thermoplastic elastomer [C] in which the component [C] is contained in a high concentration is initially obtained, and the master batch is then subjected to blend compounding or molding while diluting it with the propylene polymer [A] or the propylene block copolymer [B], to finally obtain the second propylene polymer composition.

In the preparation of the third propylene polymer composition from the components [A], [B], [C] and [D], it is also possible that a master batch composed of the propylene polymer [A], the propylene block copolymer [B], the thermoplastic elastomer [C] and the inorganic filler [D] in which the components [C] and [D] are contained in high concentrations is initially obtained, and the master batch is then subjected to blend compounding or molding while diluting it with the propylene polymer [A] or the propylene block copolymer [B], to finally obtain the third propylene polymer composition.

All the above components used for the invention are excellent in kneading properties, and can easily provide the propylene polymer compositions.

The propylene polymer compositions of the invention can provide molded products showing higher rigidity and impact resistance as compared with those obtained from a propylene polymer or from a propylene polymer and an ethylene/propylene copolymer conventionally known.

The propylene polymer compositions of the invention may further contain other components in addition to the components [A], [B], [C] and [D], with the proviso that the object of the invention is not marred.

Examples of other components include thermoplastic resins and thermosetting resins, for example, α-olefin homopolymers such as polyethylene, other polypropylene than the above and poly-1-butene, copolymers of α-olefins, copolymers of α-olefins and vinyl monomer, modified olefin polymers such as maleic anhydride modified polypropylene, nylon, polycarbonate, ABS, polystyrene, polyvinyl chloride, polyphenylene oxide, petroleum resins and phenol resins.

The propylene polymer compositions of the invention may further contain, as other components, rubbers and latexes.

Examples of such rubbers and latexes include polybutadiene, polyisobutylene, 1,2-polybutadiene/acrylonitrile/butadiene rubber, polyisoprene, styrene/butadiene rubber, styrene/butadiene/styrene block copolymer, styrene/isoprene/styrene block copolymer, hydrogenated product of styrene/isoprene/styrene block copolymer.

Furthermore, the propylene polymer compositions of the invention may contain various additives. Examples of such additives include antioxidants of phenol, sulfur and phosphorus types, lubricants, antistatic agents, dispersing agents, copper damage inhibitors, neutralizing agents, foaming agents, plasticizers, anti-foaming agents, flame retardants, crosslinking agent, flowability improvers such as peroxides, ultraviolet light absorbers, light stabilizers, and weld strength improvers.

Addition of these additives to the propylene polymer compositions of the invention makes it possible to form molded products much more improved in physical properties, balance thereof, endurance, coating properties, printability, damage resistance, molding processability, etc.

The propylene polymer compositions of the invention may also contain nucleating agents.

There is no specific limitation on the nucleating agent used herein, and various nucleating agents conventionally known can be used. Of various nucleating agents, preferably used are those represented by the following formulae.

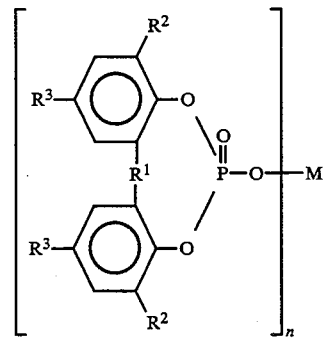

wherein $R^1$ is oxygen, sulfur or a hydrocarbon group of 1 to 10 carbon atoms; $R^2$ and $R^3$ are each hydrogen or a hydrocarbon group of 1 to 10 carbon atoms; $R^2$ and $R^3$ may be the same or different from each other; both $R^2$, both $R^3$, or $R^2$ and $R^3$ may be bonded together to form a ring; M is a monovalent to trivalent metal atom; and n is an integer of 1 to 3.

Examples of the nucleating agents represented by the above formula include sodium-2,2'-methylene-bis(4,6-di-t-butylphenyl)phosphate, sodium-2,2'-ethylidene-bis(4,6-di-t-butylphenyl)phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2'-thiobis(4-methyl-6-t-butylphenyl)phosphate], calcium-bis[2,2'-thiobis(4-ethyl-6-t-butylphenyl)phosphate], calcium-bis[2,2'-thiobis(4,6-di-t-butylphenyl)phosphate], magnesium-bis[2,2'-thiobis(4,6-di-t-butylphenyl)phosphate], magnesium-bis[2,2'-thiobis(4-t-octylphenyl)phosphate], sodium-2,2'-butylidene-bis(4,6-dimethylphenyl)phosphate, sodium-2,2'-butylidene-bis(4,6-di-t-butylphenyl)phosphate, sodium-2,2'-t-octylmethylene-bis(4,6-dimethylphenyl)phosphate, sodium-2,2'-t-octylmethylene-bis(4,6-di-t-butylphenyl)phosphate, calcium-bis[2,2'-methylene-bis(4,6-di-t-butylphenyl)phosphate], magnesium-bis[2,2'-methylene-bis(4,6-di-t-butylphenyl)phosphate], barium-bis[2,2'-methylene-bis(4,6-di-t-butylphenyl)phosphate], sodium-2,2'-methylene-bis(4-methyl-6-t-butylphenyl)phosphate, sodium-2,2'-methylene-bis(4-ethyl-6-t-butylphenyl)phosphate, sodium(4,4'-dimethyl-5,6'-di-t-butyl-2,2'-biphenyl)phosphate, calcium-bis[(4,4'-dimethyl-6,6'-di-t-butyl-2,2'-biphenyl)phosphate], sodium-2,2'-ethylidene-bis(4-m-butyl-6-t-butylphenyl)phosphate, sodium-2,2'-methylene-bis(4,6-dimethylphenyl)phosphate, sodium-2,2'-methylene-bis(4,6-diethylphenyl)phosphate, potassium-2,2'-ethylidene-bis(4,6-di-t-butylphenyl)phosphate, calcium-bis[2,2'-ethylidene-bis(4,6-di-t-butylphenyl)phosphate], magnesium-bis[2,2'-ethylidene-bis(4,6-di-t-butylphenyl)phosphate], barium-bis[2,2'-ethylidene-bis(4,6-di-t-butylphenyl)phosphate], aluminum-tris[2,2'-methylene-bis(4,6-di-t-butylphenyl)phosphate] and aluminum-tris[2,2'-ethylidene-bis(4,6-di-t-butylphenyl)phosphate]. Mixtures of two or more of these nucleating agents are also employable. Of these, preferred is sodium-2,2'-methylene-bis(4,6-di-t-butylphenyl)phosphate.

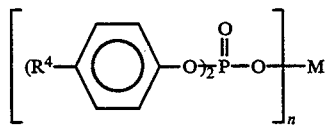

wherein $R^4$ is hydrogen or a hydrocarbon group of 1 to 10 carbon atoms; M is a monovalent to trivalent metal atom; and n is an integer of 1 to 3.

Examples of the nucleating agents represented by the above formula include sodium-bis(4-t-butylphenyl)phosphate, sodium-bis(4-methylphenyl)phosphate, sodium-bis(4-ethylphenyl)phosphate, sodium-bis(4-i-propylphenyl)phosphate, sodium-bis(4-t-octylphenyl)phosphate, potassium-bis(4-t-butylphenyl)phosphate, calcium-bis(4-t-butylpheyl)phosphate, magnesium-bis(4-t-butylpheyl)phosphate, lithium-bis(4-t-butylpheyl)phosphate and aluminum-bis(4-t-butylpheyl)phosphate. Mixtures of two or more of these nucleating agents are also employable. Of these, preferred is sodium-bis(4-t-butylphenyl)phosphate.

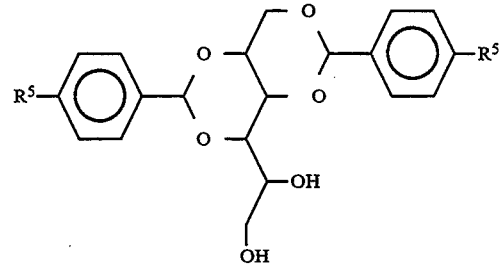

wherein $R^5$ is hydrogen or a hydrocarbon group of 1 to 10 carbon atoms.

Examples of the nucleating agents represented by the above formula include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol and 1,3,2,4-di(p-chlorobenzylidene)sorbitol. Mixtures of two or more of these nucleating agents are also employable. Of these, preferred are 1,3,2,4-dibenzylidenesorbitol, 1,3,2,4-di(p-methylbenzylidene)sorbitol, 1,3,2,4-di(p-ethylbenzylidene)sorbitol, 1,3-p-chlorobenzylidene-2,4-p-methylbenzylidenesorbitol, 1,3,2,4-di(p-chlorobenzylidene)sorbitol and mixtures of two or more of these nucleating agents.

Also employable as the nucleating agents are metallic salts of aromatic carboxylic acids and metallic salts of aliphatic carboxylic acids, and examples thereof include aluminum benzoate, aluminum p-t-butylbenzoate, sodium adipate, sodium thiophenecarboxylate and sodium pyrrolecarboxylate. Inorganic compounds such as talc may also be employed.

In the propylene polymer compositions of the invention, the nucleating agent is desirably contained in an amount of 0.001 to 10 parts by weight, preferably 0.01 to 5 parts by weight, more preferably 0.1 to 3 parts by weight, based on 100 parts by weight of the propylene polymer [A].

In the propylene polymer compositions containing the nucleating agent, the crystal particles can be made smaller, and the crystallization speed can be heightened, whereby high-speed molding can be attained.

EFFECT OF THE INVENTION

From the propylene polymer compositions according to the invention comprising the specific propylene polymer [A] and the specific propylene block copolymer

[B], molded products excellent in rigidity and impact strength as well as in heat resistance can be produced.

Further, from the propylene polymer compositions of the invention, molded products excellent also in coating properties, dimensional stability and appearance can be produced.

EXAMPLE

The present invention is further described with reference to the following examples, but it should be construed that the invention is in no way limited to those examples.

In the following examples and comparative examples, measurement of various properties was carried out by the methods described below.

(1) Melt Flow Rate (MFR)

The melt flow rate was measured in accordance with ASTM D-1238 under the following conditions.

Conditions: 230° C., 2.16 kg (pellet)

(2) Flexural Modulus (FM)

The flexural modulus was measured by a flexural test in accordance with ASTM D-790 under the following conditions.

Specimen: 12.7 mm (thickness)×3.2 mm (width)×127 mm (length)
Span: 51 mm
Flexural speed: 20 mm/min
Measuring temperature: 23° C.

(3) Izod Impact Strength (IZ)

The Izod impact strength was measured by an impact test in accordance with ASTM D-256 under the following conditions.

Specimen: 12.7 mm (width)×6.4 mm (thickness)×64 mm (length), mechanically notched
Measuring temperature: 23° C.

(4) Rockwell Hardness (HR)

The Rockwell hardness was measured in accordance with ASTM D-648 under the following conditions.

Scale: R
Specimen: 120 mm (length)×3.2 mm (width)×127 mm (thickness)
Measuring temperature: 23° C.

(5) Heat Distortion Temperature (HDT)

The heat distortion temperature was measured in accordance with ASTM D-648 under the following conditions.

Specimen: 12.7 mm (thickness)×6.4 mm (width)×127 mm (length)
Load: 4.6 kg/cm$^2$ The propylene polymers [A] and the propylene block copolymers [B] used in the following examples are those prepared by the processes described below.

Preparation Example 1

Preparation of Propylene Polymer [A] (PP-1)

[Preparation of solid titanium catalyst component [A]]

To a 4.5 m$^3$ reactor were introduced 240 kg of anhydrous magnesium chloride, 1,100 liters of decane and 990 kg of 2-ethylhexyl alcohol, and they were reacted under heating at 130° C. to give a homogeneous solution. To the solution was added 54 kg of phthalic anhydride, and the mixture was stirred at 130° C. to dissolve the phthalic anhydride. After the resulting homogeneous solution was cooled to room temperature, the whole solution was dropwise added to 6.7 m$^3$ of titanium tetrachloride kept at −25° C. with stirring. At the end of the addition, the temperature of the resulting mixture was about −20° C. The temperature was elevated to 110° C. over a period of 4 hours. When the temperature reached 110° C., 13 kg of diisobutyl phthalate (DIBP) was added to the solution, followed by stirring at the same temperature for 2 hours. After the end of the 2-hour reaction, the mixture was hot filtered to separate a solid, which was resuspended in 7.3 m$^3$ of titanium tetrachloride, and the resulting suspension was further reacted under heating at 110° C. for 2 hours. After the end of the reaction, the mixture was hot filtered to separate a solid which was thoroughly washed with decane and hexane at 110° C. until any titanium compound liberating in the filtrate was not detected. Through the above operation, a solid titanium catalyst component [A] was obtained. This solid titanium catalyst component [A] had a composition comprising 2.2% by weight of titanium, 60% by weight of chlorine, 20% by weight of magnesium and 12.9% by weight of DIBP.

[Prepolymerization in the presence of the solid titanium catalyst component [A]]

To a 80 liter-reactor equipped with a stirrer were introduced 40 liters of purified hexane, 3.0 mol of triethylaluminum, 3.0 mol of trimethylmethoxysilane and 0.3 mol (in terms of titanium atom) of the solid titanium catalyst component [A] in a nitrogen atmosphere. Then, 1.5 kg of 3-methyl-3-butene was further added to the reactor at 20° C. to perform prepolymerization reaction for 2 hours.

After the end of the reaction, the reactor was purged with nitrogen, and washing operation consisting of removal of a supernatant and addition of purified hexane was carried out three times, to obtain a prepolymerized catalyst [B].

The prepolymerized catalyst [B] was resuspended in purified hexane and stored.

[Polymerization]

To a 1,000-liter reactor equipped with a stirrer was introduced 450 liters of purified n-hexane, and then were added 500 mmol of triethylaluminum, 500 mmol of dicyclopentyldimethoxysilane and 10 mmol (in terms of titanium atom) of the prepolymerized catalyst [B] at 60° C. in a propylene atmosphere.

To the reactor was fed 1,100 Nl of hydrogen, and the temperature of the reactor was raised to 80° C., followed by keeping it at the same temperature for 4 hours to polymerize propylene. The pressure during the polymerization was kept at 6 kg/cm$^2$-G. After the polymerization, the pressure was released, and the slurry containing a solid produced was centrifuged to separate the product which was then dried with a dryer. Thus, 200 kg of a white powdery polymer was obtained. The results are shown in Table 1.

Preparation Example 2

Preparation of Propylene Polymer [A] (PP-2)

[Polymerization]

The procedures for the polymerization in Preparation Example 1 were repeated except that 700 Nl of hydrogen was introduced into the reactor and the polymerization was carried out for 3 hours, to obtain 200 kg of a white powdery polymer (PP-2). The results are shown in Table 1.

Preparation Example 3

Preparation of Propylene Polymer [A] (PP-3)

[Polymerization]

The procedures for the polymerization in Preparation Example 1 were repeated except that 1,000 Nl of hydrogen was introduced into the reactor, to obtain 200 kg of a white powdery polymer (PP-3). The results are shown in Table 1.

Preparation Example 4

Preparation of Propylene Polymer [A] (PP-4)

The procedures of Preparation Example 4 were repeated except that the polymerization was carried out twice, to prepare a propylene polymer (PP-4). The results are shown in Table 1.

TABLE 1

| Polymer | Content of 3-MB-1 (mol %) | MFR (g/10 min) | Boiling heptane-insoluble component | | | 23° C. n-Decane-soluble component wt % |
|---|---|---|---|---|---|---|
| | | | wt. % | $M_5$ value | $M_3$ value | |
| PP-1 | 0.02 | 23 | 98.5 | 0.990 | 0.0030 | 0.7 |
| PP-2 | 0.02 | 10 | 98.5 | 0.992 | 0.0030 | 0.4 |
| PP-3 | 0.02 | 17 | 98.5 | 0.990 | 0.0030 | 0.5 |
| PP-4 | 0.02 | 28 | 98.6 | 0.990 | 0.0030 | o.7 |

3-MB-1: constituent units derived from 3-methyl-1-butene.

Preparation Example 5

Preparation of Propylene Block Copolymer [B] (BPP-1)

[Prepolymerization in the presence of solid titanium catalyst component [A]]

To a 80 liter-reactor equipped with a stirrer were introduced 40 liters of purified hexane, 3.0 mol of triethylaluminum, 0.6 mol of dicylopentyldimethoxysilane and 0.3 mol (in terms of titanium atom) of the solid titanium catalyst component [A] in a nitrogen atmosphere. Then, 1.66 kg of propylene was fed to the reactor at 20° C. to prepolymerize for 2 hours.

After the end of the reaction, the reactor was purged with nitrogen, and washing operation consisting of removal of a supernatant and addition of purified hexane was carried out three times, to obtain a prepolymerized catalyst [C].

The prepolymerized catalyst [C] was resuspended in purified hexane and stored.

[Polymerization]

To a 1,000-liter reactor equipped with a stirrer was introduced 450 liters of purified n-hexane, and then were added 500 mmol of triethylaluminum, 500 mmol of dicyclopentyldimethoxysilane and 5 mmol (in terms of titanium atom) of the prepolymerized catalyst [C] at 60° C. in a propylene atmosphere.

After 1,500 Nl of hydrogen was fed to the reactor, the temperature of the reactor was raised to 80° C., and propylene was fed in such a manner that the pressure in the reactor was kept at 6 kg/cm$^2$-G, so as to polymerize propylene. After 2 hours, the pressure was released, and the unreacted propylene and hydrogen were removed from the reactor to terminate the homopolymerization of propylene. After 40 Nl of hydrogen was added to the reactor at 50° C., ethylene and propylene were added at a ratio of 37% by mol of ethylene and 63% by mol of propylene. The reactor was kept at a temperature of 60° C. and a pressure of 6 kg/cm$^2$-G to copolymerize ethylene and propylene. After 30 minutes, the polymerization was terminated by adding isobutyl alcohol. After the pressure was released, the slurry containing a solid produced was centrifuged to separate the product which was then dried with a dryer. Thus, 200 kg of a white powdery polymer was obtained. The results are shown in Table 2.

Preparation Example 6

Preparation of Propylene Block Copolymer [B] (BPP-2)

The procedures of Example 5 were repeated except that the amount of hydrogen added in the propylene homopolymerization was changed to 2,100 Nl and the propylene homopolymerization time was changed to 2.5 hours, to obtain 190 kg of a white powdery polymer. The results are shown in Table 2.

Preparation Example 7

Preparation of Propylene Block Copolymer [B] (BPP-3)

The procedures of Example 5 were repeated except that the polymerization was carried out twice, to prepare a propylene block copolymer (BPP-3). The results are shown in Table 2.

Preparation Example 8

Preparation of Propylene Block Copolymer [B] (BPP-4)

The procedures of Example 5 were repeated except that the amount of hydrogen added in the propylene homopolymerization was changed to 1,300 Nl, to obtain 220 kg of a white powdery polymer. The results are shown in Table 2.

TABLE 2

| Polymer | MFR (g/10 min) | 23° C. n-Decane-soluble component | | |
|---|---|---|---|---|
| | | Content (wt. %) | Constituent units derived from ethylene (mol. %) | Intrinsic viscosity (dl/g) |
| BPP-1 | 25 | 7.5 | 40 | 5.0 |
| BPP-2 | 54 | 7.5 | 40 | 5.0 |
| BPP-3 | 25 | 8 | 40 | 5.0 |
| BPP-4 | 16 | 8 | 40 | 5.0 |

EXAMPLES 1–4

The propylene polymers [A] and the propylene block copolymers [B] prepared as above were kneaded and granulated at 200° C. by means of a twin-screw extruder to obtain compositions shown in Table 3.

The compositions thus obtained were molded into ASTM specimens by means of an injection molding machine under the conditions of a resin temperature of 200° C. and a mold temperature of 40° C. The specimens were measured on the aforesaid properties. The results are shown in Table 3.

COMPARATIVE EXAMPLE 1

Specimens were prepared from the propylene polymer PP-1 under the same conditions as described in Example 1, and measured on the aforesaid properties. The results are shown in Table 3.

COMPARATIVE EXAMPLE 2 AND 3

Specimens were prepared each of the propylene block copolymers BPP-1 and BPP-2 under the same manner as described in Example 1, and measured on the aforesaid properties. The results are shown in Table 3.

TABLE 3

| [wt %] | Example | | | | Comparative Example | | |
|---|---|---|---|---|---|---|---|
| | 1 | 2 | 3 | 4 | 1 | 2 | 3 |
| Composition | | | | | | | |
| [A] Propylene polymer | | | | | | | |
| PP-1 | 10 | 50 | 75 | 50 | 100 | | |
| PP-2 | | | | | | | |
| [B] Propylene block copolymer | | | | | | | |
| BPP-1 | 90 | 50 | 25 | | | 100 | |
| BPP-2 | | | | 50 | | | 100 |
| Physical properties | | | | | | | |
| MFR [g/10 min] | 23 | 23 | 23 | 35 | 23 | 20 | 54 |
| MF [Kg/cm$^2$] | 20700 | 22000 | 22500 | 19800 | 22800 | 14500 | 15000 |
| IZ [kg · cm/cm] | 3.5 | 4.0 | 4.0 | 4.5 | 2.0 | 4.0 | 3.5 |
| HDT [°C.] | 143 | 148 | 148 | 142 | 148 | 118 | 121 |

EXAMPLES 5-10

The propylene polymers [A] and the propylene block copolymers [B] prepared as above and the following thermoplastic elastomers in the amounts set forth in Table 4 were kneaded and granulated at 200° C. by means of a twin-screw extruder to obtain compositions shown in Table 4.

The compositions thus obtained were molded into ASTM specimens and 3 mm-thick flat plates (120 mm × 130 mm) by means of an injection molding machine under the conditions of a resin temperature of 200° C. and a mold temperature of 40° C. The specimens and the flat plates were measured on the aforesaid properties. The results are shown in Table 4.

The thermoplastic elastomers [C] shown in Table 4 are those described below.

EPR: ethylene/propylene random copolymer containing constituent units derived from ethylene in an amount of 40% by mol; MFR=0.5 g/10 min.

EBR: ethylene/1-butene copolymer containing constituent units derived from ethylene in an amount of 82% by mol; MFR=1.0 g/10 min.

SEBS: content of constituent units derived from ethylene=18% by mol; MFR=2 g/10 min (Trade name: Kraton G1652, available from Shell Kagaku K.K.).

COMPARATIVE EXAMPLES 4-7

The procedures of Example 5 were repeated except that the propylene polymer compositions shown in Table 4 were used in place of the propylene polymer composition of Example 5. The aforesaid properties were measured. The results are shown in Table 4.

TABLE 4

| [wt %] | Example | | | | | | Comparative Example | | | |
|---|---|---|---|---|---|---|---|---|---|---|
| | 5 | 6 | 7 | 8 | 9 | 10 | 4 | 5 | 6 | 7 |
| Composition | | | | | | | | | | |
| PP-2 | | | 26 | 17 | | | | | 58 | |
| PP-3 | 70 | | | | | 31 | | | | |
| PP-4 | | 40 | | 23 | 40 | 39 | 75 | | 22 | |
| Composition | | | | | | | | | | |
| BPP-3 | 8 | 40 | 55 | | | | | | | |
| BPP-4 | | | | 40 | 40 | 8 | | 85 | | 83 |
| Composition | | | | | | | | | | |
| EPR | 22 | 20 | 19 | | | | 25 | 15 | 10 | |
| EBR | | | | 10 | | | | | 10 | |
| SEBS | | | | 10 | 20 | 22 | | | | 17 |
| MFR [g/10 min] | 9 | 11 | 10 | 12 | 13 | 11 | 10 | 14 | 10 | 12 |
| FM [kg/cm$^2$] | 16400 | 15500 | 14600 | 16200 | 17000 | 18000 | 14800 | 14200 | 16500 | 14500 |
| IZ [kg · cm/cm] | 20.0 | 23.7 | 24.3 | 36.0 | 34.1 | 30.0 | 15.0 | 11.5 | 18.5 | 20.8 |
| HR | 79 | 78 | 76 | 80 | 86 | 89 | 79 | 80 | 85 | 85 |
| HDT [°C.] | 124 | 126 | 131 | 132 | 134 | 130 | 124 | 122 | 132 | 130 |

EXAMPLES 11-16

Compositions were prepared from the components shown in Table 5 in the same manner as described in Example 5.

The compositions thus obtained were molded into ASTM specimens and 3 mm-thick flat plates (120 mm × 130 mm) by means of an injection molding machine under the conditions of a resin temperature of 200° C. and a mold temperature of 40° C. The specimens and the flat plates were measured on the aforesaid properties. The results are shown in Table 5.

The propylene polymers [A], the propylene block copolymers [B] and the thermoplastic elastomers [C] which were used for preparing the compositions shown in Table 5 were the same as those shown in Table 4, and the following talc was used in these examples.

Talc: mean particle diameter=2.5 μm, content of particles having a particle diameter of not less than 5 μm=3% by weight.

COMPARATIVE EXAMPLES 8–11

The procedures of Example 11 were repeated except that the propylene polymer compositions shown in Table 5 were used in place of the propylene polymer composition of Example 11. The aforesaid properties were measured. The results are shown in Table 5.

TABLE 5

| [wt %] | Example | | | | | | Comparative Example | | | |
|---|---|---|---|---|---|---|---|---|---|---|
| | 11 | 12 | 13 | 14 | 15 | 16 | 8 | 9 | 10 | 11 |
| Composition | | | | | | | | | | |
| PP-2 | | | 23 | 15 | | | | | 51 | |
| PP-3 | 62.5 | | | | | 27.5 | | | | |
| PP-4 | | 36 | | 20 | 36 | 35 | 67 | | 20 | |
| Composition | | | | | | | | | | |
| BPP-3 | 7 | 36 | 49 | | | | | | | |
| BPP-4 | | | | 36 | 36 | 7 | | 76 | | 74 |
| Composition | | | | | | | | | | |
| EPR | 19.5 | 17 | 17 | | | | 22 | 13 | 9 | |
| EBR | | | | 9 | | | | | 9 | |
| SEBS | | | | 9 | 17 | 19.5 | | | | 15 |
| Talc | 11 | 11 | 11 | 11 | 11 | 11 | 11 | 11 | 11 | 11 |
| MFR [g/10 min] | 9 | 11 | 10 | 12 | 14 | 11 | 11 | 16 | 12 | 12 |
| FM [kg/cm$^2$] | 21400 | 20700 | 19400 | 21300 | 22000 | 23100 | 20000 | 19400 | 21900 | 19500 |
| IZ [kg · cm/cm] | 21.8 | 25.9 | 24.1 | 37.0 | 35.9 | 29.2 | 15.0 | 12.0 | 19.0 | 22.1 |
| HR | 82 | 81 | 78 | 82 | 89 | 93 | 82 | 82 | 87 | 88 |
| HDT [°C.] | 134 | 136 | 141 | 140 | 144 | 140 | 134 | 133 | 143 | 140 |

What is claimed is:

1. A propylene polymer composition comprising:
   [A] a propylene polymer in an amount of 10 to 90% by weight, and
   [B] a propylene block copolymer in an amount of 90 to 10% by weight;
   said propylene polymer [A] having the following characteristic properties:
   (1) a boiling heptane-insoluble component is contained in said polymer in an amount of not less than 96% by weight;
   (2) a pentad isotacticity [M$_5$] of the boiling heptane-insoluble component obtained from the following formula (1) using a $^{13}$C-NMR spectrum is in the range of 0.970 to 0.995:

$$[M_5] = \frac{[Pmmmm]}{[Pw]} \quad (1)$$

wherein
   [Pmmmm] is absorption intensity of methyl groups on third propylene units in five propylene unit sequences where the five units are bonded isotactically to each other, and
   [Pw] is absorption intensity of all methyl groups in propylene units;
   (3) a pentad tacticity [M$_3$] of the boiling heptane-insoluble component obtained from the following formula (2) using a $^{13}$C-NMR spectrum is in the range of 0.0020 to 0.0050:

$$[M_3] = \frac{[Pmmrm] + [Pmrmr] + [Pmrrr] + [Prmrr] + [Prmmr] + [Prrrr]}{[Pw]} \quad (2)$$

wherein
   [Pmmrm] is absorption intensity of methyl groups on third propylene units in five propylene unit sequences represented by ⌡ ⌡ ⌡ ⌐ ⌐ in which ⌡ and ⌐ are each a propylene unit,
   [Pmrmr] is absorption intensity of methyl groups on third propylene units in five propylene unit sequences represented by ⌡ ⌡ ⌐ ⌐ ⌡ in which ⌡ and ⌐ are each a propylene unit,
   [Pmrrr] is absorption intensity of methyl groups on third propylene unit in five propylene unit sequences represented by ⌡ ⌡ ⌐ ⌡ ⌐ in which ⌡ and ⌐ are each a propylene unit,
   [Prmrr] is absorption intensity of methyl groups on third propylene units in five propylene unit sequences represented by ⌐ ⌡ ⌡ ⌐ ⌡ in which ⌡ and ⌐ are each a propylene unit,
   [Prmmr] is absorption intensity of methyl groups on third propylene units in five propylene unit sequences represented by ⌐ ⌡ ⌡ ⌡ ⌐ in which ⌡ and ⌐ are each a propylene unit,
   [Prrrr] is absorption intensity of methyl groups on third propylene units in five propylene unit sequences represented by ⌡ ⌐ ⌡ ⌐ ⌡ in which ⌡ and ⌐ are each a propylene unit, and
   [Pw] is absorption intensity of all methyl groups in propylene units; and
   (4) a melt flow rate (MFR) of said polymer, as measured in accordance with ASTM D-1238 at 230° C. under a load of 2.16 kg, is in the range of 5 to 50 g/10 min;
   said propylene block copolymer [B] having the following characteristic properties:
   (1) a melt flow rate (MFR) of said copolymer, as measured in accordance with ASTM D-1238 at 230° C. under a load of 2.16 kg, is in the range of 10 to 50 g/10 min,
   (2) a 23° C. n-decane-soluble component is contained in said copolymer in an amount of 5 to 13% by weight, and
   (3) constituent units derived from ethylene are contained in the 23° C. n-decane-soluble component in an amount of 30 to 50% by mol.

2. A propylene polymer composition comprising:
   [A] a propylene polymer in an amount of 10 to 80% by weight,

[B] a propylene block copolymer in an amount of 5 to by weight, and

[C] a thermoplastic elastomer in an amount of 10 to 30% by weight, selected from polystyrene.polyethylene/polybutylene.polystyrene block copolymers and ethylene/α-olefin random copolymers;

said propylene polymer [A] having the following characteristic properties:

(1) a boiling heptane-insoluble component is contained in said polymer in an amount of not less than 96% by weight;

(2) a pentad isotacticity [$M_5$] of the boiling heptane-insoluble component obtained from the following formula (1) using a $^{13}$C-NMR spectrum is in the range of 0.970 to 0.995:

$$[M_5] = \frac{[Pmmmm]}{[Pw]} \quad (1)$$

wherein

[Pmmmm] is absorption intensity of methyl groups on third propylene units in five propylene unit sequences where the five units are bonded isotactically to each other, and

[Pw] is absorption intensity of all methyl groups in propylene units;

(3) a pentad tacticity [$M_3$] of the boiling heptane-insoluble component obtained from the following formula (2) using a $^{13}$C-NMR spectrum is in the range of 0.0020 to 0.0050:

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups on third propylene units in five propylene unit sequences represented by ⌋ ⌋ ⌋ ⌐ ⌐ in which ⌋ and ⌐ are each a propylene unit,

[Pmrmr] is absorption intensity of methyl groups on third propylene units in five propylene unit sequences represented by ⌋ ⌋ ⌐ ⌐ ⌋ in which ⌋ and ⌐ are each a propylene unit,

[Pmrrr] is absorption intensity of methyl groups on third propylene units in five propylene unit sequences represented by ⌋ ⌋ ⌐ ⌋ ⌐ in which ⌋ and ⌐ are each a propylene unit,

[Prmrr] is absorption intensity of methyl groups on third propylene units in five propylene unit sequences represented by ⌐ ⌋ ⌋ ⌐ ⌋ in which ⌋ and ⌐ are each a propylene unit,

[Prmmr] is absorption intensity of methyl groups on third propylene units in five propylene unit sequences represented by ⌐ ⌋ ⌋ ⌋ ⌐ in which ⌋ and ⌐ are each a propylene unit,

[Prrrr] is absorption intensity of methyl groups on third propylene units in five propylene unit sequences represented by ⌋ ⌐ ⌋ ⌐ ⌋ in which ⌋ and ⌐ are each a propylene unit, and

[Pw] is absorption intensity of all methyl groups in propylene units; and (4) a melt flow rate (MFR) of said polymer, as measured in accordance with ASTM D-1238 at 230° C. under a load of 2.16 kg, is in the range of 5 to 50 g/10 min;

said propylene block copolymer [B] having the following characteristic properties:

(1) a melt flow rate (MFR) of said copolymer, as measured in accordance with ASTM D-1238 at 230° C. under a load of 2.16 kg, is in the range of 10 to 50 g/10 min, (2) a 23° C. n-decane-soluble component is contained in said copolymer in an amount of 5 to 13% by weight, and (3) constituent units derived from ethylene are contained in the 23° C. n-decane-soluble component in an amount of 30 to 50% by mol.

3. A propylene polymer composition comprising:

[A] a propylene polymer in an amount of 10 to 70% by weight,

[B] a propylene block copolymer in an amount of 5 to 60% by weight,

[C] a thermoplastic elastomer in an amount of 15 to 25% by weight, selected from polystyrene.polyethylene/polybutylene.polystyrene block copolymers and ethylene/α-olefin random copolymers, and

[D] an inorganic filler in an amount of 5 to 15% by weight;

said propylene polymer [A] having the following characteristic properties:

(1) a boiling heptane-insoluble component is contained in said polymer in an amount of not less than 96% by weight;

(2) a pentad isotacticity [$M_5$] of the boiling heptane-insoluble component obtained from the following formula (1) using a $^{13}$C-NMR spectrum is in the range of 0.970 to 0.995:

$$[M_5] = \frac{[Pmmmm]}{[Pw]} \quad (1)$$

wherein

[Pmmmm] is absorption intensity of methyl groups on third propylene units in five propylene unit sequences where the five units are bonded isotactically to each other with meso form, and

[Pw] is absorption intensity of all methyl groups in a propylene unit;

(3) a pentad tacticity [$M_3$] of the boiling heptane-insoluble component obtained from the following formula (2) using a $^{13}$C-NMR spectrum is in the range of 0.0020 to 0.0050:

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups on third propylene units in five propylene unit sequences represented by ⌋ ⌋ ⌋ ⌐ ⌐ in which ⌋ and ⌐ are each a propylene unit,

[Pmrmr] is absorption intensity of methyl groups on third propylene units in five propylene unit sequences represented by ⌋ ⌋ ⌐ ⌐ ⌋ in which ⌋ and ⌐ are each a propylene unit,

[Pmrrr] is absorption intensity of methyl groups on third propylene units in five propylene unit sequences represented by ⌋ ⌋ ⌐ ⌋ ⌐ in which ⌋ and ⌐ are each a propylene unit,

[Prmrr] is absorption intensity of methyl groups on third propylene units in five propylene unit sequences represented by ⊓ ⊔ ⊔ ⊓ ⊔ in which ⊔ and ⊓ are each a propylene unit,

[Prmmr] is absorption intensity of methyl groups on third propylene units in five propylene unit sequences represented by ⊓ ⊔ ⊔ ⊔ ⊓ in which ⊔ and ⊓ are each a propylene unit,

[Prrrr] is absorption intensity of methyl groups on third propylene units in five propylene unit sequences represented by ⊔ ⊓ ⊔ ⊓ ⊔ in which ⊔ and ⊓ are each a propylene unit, and

[Pw] is absorption intensity of all methyl groups in propylene units; and (4) a melt flow rate (MFR) of said polymer, as measured in accordance with ASTM D-1238 at 230° C. under a load of 2.16 kg, is in the range of 5 to 50 g/10 min;

said propylene block copolymer [B] having the following characteristic properties:

(1) a melt flow rate (MFR) of said copolymer, as measured in accordance with ASTM D-1238 at 230° C. under a load of 2.16 kg, is in the range of 10 to 50 g/10 min, (2) a 23° C. n-decane-soluble component is contained in said copolymer in an amount of 5 to 13% by weight, and (3) constituent units derived from ethylene are contained in the 23° C. n-decane-soluble component in an amount of 30 to 50% by mol.

4. The propylene polymer composition as claimed in any one of claims 1 to 3, wherein the propylene polymer [A] contains constituent units derived from a compound represented by the following formula (i) or (ii) in an amount of 0.005 to 0.05% by mol:

$$H_2C=CH-X \quad (i)$$

$$H_2C=CH-CH_2X \quad (ii)$$

wherein X is a cycloalkyl group, an aryl group or

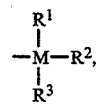

$$-\underset{\underset{R^3}{|}}{\overset{\overset{R^1}{|}}{M}}-R^2,$$

M is carbon or silicon, $R^1$ and $R^2$ are each a hydrocarbon group, and $R^3$ is hydrogen or a hydrocarbon group.

5. The propylene polymer composition as claimed in claim 4, wherein the compound represented by the formula (i) or (ii) is 3-methyl-1-butene.

* * * * *